United States Patent
Oshita et al.

(10) Patent No.: US 6,596,807 B2
(45) Date of Patent: Jul. 22, 2003

(54) PROCESS FOR PRODUCING VINYL ALCOHOL POLYMER COMPOSITIONS

(75) Inventors: Tatsuya Oshita, Kurashiki (JP); Goki Uehara, Kurashiki (JP); Nobuhisa Senda, Kurashiki (JP); Yoshiki Takeda, Kurashiki (JP); Yukiatsu Komiya, Kurashiki (JP); Syuichi Kanao, Kurashiki (JP); Shigeki Takada, Kurashiki (JP); Naoki Kawakami, Kurashiki (JP); Kanenori Ito, Sakai (JP)

(73) Assignee: Kuraray Co., Ltd., Kurashiki (JP)

( * ) Notice: Subject to any disclaimer, the term of this patent is extended or adjusted under 35 U.S.C. 154(b) by 185 days.

(21) Appl. No.: 09/916,502

(22) Filed: Jul. 30, 2001

(65) Prior Publication Data

US 2002/0055579 A1 May 9, 2002

(30) Foreign Application Priority Data

Jul. 28, 2000 (JP) ........................................ 2000-229459

(51) Int. Cl.⁷ .............................................. C08L 29/04
(52) U.S. Cl. ........................ 524/557; 524/445; 524/446; 524/503; 525/62; 418/476.3; 418/483; 418/500; 418/516
(58) Field of Search ................................ 524/445, 446, 524/503, 557; 525/62; 428/476.3, 483, 500, 516

(56) References Cited

U.S. PATENT DOCUMENTS 6,444,751 B1 * 9/2002 Chujo et al. .................. 525/61
2002/0197480 A1 * 12/2002 Umekawa et al. .......... 428/413

FOREIGN PATENT DOCUMENTS

| DE | 252 834 | 12/1987 |
|---|---|---|
| DE | 276 484 | 2/1990 |
| DE | 276 485 | 2/1990 |
| DE | 294 951 | 10/1991 |
| EP | 1 046 673 | 10/2000 |
| WO | WO 00/18838 | 4/2000 |

* cited by examiner

Primary Examiner—Helen L. Pezzuto
(74) Attorney, Agent, or Firm—Oblon, Spivak, McClelland, Maier, Neustadt, P.C.

(57) ABSTRACT

A vinyl alcohol polymer composition (II) is produced by a process of providing a reaction liquid comprising a solution containing a vinyl carboxylate polymer and, a first metal alkoxide (I) having at least one functional group and/or an oligomer (I) having at least one functional group obtained from said metal alkoxide (I); a step of simultaneously effecting (a) saponification of said vinyl carboxylate polymer and (b) reaction in which at least part of the functional groups of said metal alkoxide (I) and/or said oligomer (I) participates, thereby obtaining a vinyl alcohol polymer composition (I); and a step of preparing a solution (A) containing said vinyl alcohol polymer composition (I), followed by adding to the solution (A) a second metal alkoxide (II) and/or an oligomer (II) obtained from the metal alkoxide (II) or another solution (B) containing the metal alkoxide (II) and/or the oligomer (II) derived from the metal alkoxide (II), to prepare an intermediate product solution (C), and then removing the solvent from said solution (C). The vinyl alcohol polymer composition obtained by the above process has excellent gas-barrier properties, in particular excellent gas-barrier properties under high-humidity conditions. The vinyl alcohol polymer composition is suitably usable as a coating agent having good storage stability and little uneven applicability, and as gas-barrier material, in particular laminate having excellent gas-barrier properties under high-humidity conditions.

17 Claims, No Drawings

PROCESS FOR PRODUCING VINYL ALCOHOL POLYMER COMPOSITIONS

BACKGROUND OF THE INVENTION

1. Field of the Invention

The present invention relates to a process for producing vinyl alcohol polymer compositions having excellent gas-barrier properties, in particular excellent gas-barrier properties under high-humidity conditions.

2. Discussion of the Background

Materials for packaging foods and other various items are often required to have good gas-barrier properties, in particular good oxygen gas-barrier property, in order to prevent the contents from being degraded by, for example, oxidation with oxygen or similar oxidants. Presence of oxygen causes microorganisms to proliferate and rot the contents, especially in packaged foods. Conventional packaging materials for foods are therefore provided with a gas-barrier layer to protect the contents against penetration of oxygen or the like.

Examples of a gas-barrier layer are metal foils and layers on which a metal or metal compound has been deposited. In general, aluminum foils and layers on which aluminum has been deposited are used for this purpose. However, use of these metals causes the contents to become invisible and the packaging materials to become difficult to dispose after use.

Vinyl alcohol polymers having good gas-barrier properties, such as polyvinyl alcohol and ethylene-vinyl alcohol copolymer are sometimes used as the gas-barrier layer. These vinyl alcohol polymers have the advantages of being transparent and causing fewer problems on disposal after use, so that they have been applied to wider range of uses.

These vinyl alcohol polymers show good gas-barrier properties because they crystallize due to hydrogen bonding of hydroxyl groups present in their molecules. They exhibit therefore good gas-barrier properties when they are dry. However, it is known that, when they have absorbed moisture such as water vapor present in the surrounding atmosphere, the hydrogen bonds are loosened. As a result, the vinyl alcohol polymers tend to exhibit poor gas-barrier properties. Thus, it is difficult to provide conventional vinyl alcohol polymers, such as polyvinyl alcohol, with satisfactory gas-barrier properties even under high-humidity conditions.

A method for decreasing the moisture-absorbing property of vinyl alcohol polymers comprises copolymerizing an olefin such as ethylene, yielding ethylene-vinyl alcohol copolymer. However, this kind of copolymerization, which decreases the content of vinyl alcohol units, tends to impair the inherent gas-barrier properties. Consequently, this method cannot produce vinyl alcohol polymers having good gas-barrier properties under both dry and high-humidity conditions.

In recent years, a process for preparing organic/inorganic complexes comprising an organic polymer and a metal oxide dispersed relatively finely in the polymer has been proposed. This process comprises, making use of what is known as sol gel process, polycondensing a metal alkoxide such as a silicon alkoxide in the presence of an organic polymer. For example, in order to produce vinyl alcohol polymer-based materials possessing improved water resistance, Japanese Patent Nos. 2446940 and 2880654 disclose a composition obtained by a process which comprises hydrolyzing and polycondensing a tetraethoxysilane in the presence of polyvinyl alcohol and/or ethylene-vinyl alcohol copolymer and a silane-coupling agent. Japanese Patent Application Laid-open No. 278968/1997 discloses a composition obtained by hydrolyzing and polycondensing tetraethoxysilane in the presence of a silyl-modified vinyl alcohol polymer modified with a reactable silane compound such as triethoxychlorosilane. Japanese Patent Application Laid-open No. 1515/1998 discloses a silyl-modified vinyl alcohol polymer composition obtained by hydrolyzing with hydrochloric acid a copolymerized product of a polymerizable silane compound (e.g. vinyl trimethoxysilane) and a vinyl carboxylate (e.g. vinyl acetate).

According to the study performed by the present inventors, it has been found that with the compositions described in the above Japanese Patent Nos. 2446940 and 2880654, there occurs poor phase separation condition (i.e. increase in the size of phase separation), which is considered to be due to high crystallinity of the starting material vinyl alcohol polymer.

The compositions described in the above Japanese Patent Application Laid-open Nos. 278968/1997 and 1515/1998 have been found to be still insufficient in water resistance, although they have improved the condition of phase separation to some extent. This is attributable to non-uniformity in the positions of introduction of the modifying groups as caused by different reactivity of the hydroxyl groups present in the vinyl alcohol polymer and by poor copolymerizability of the polymerizable silane compound and vinyl carboxylate compound.

It has also been found as the results of the study performed by the present inventors, that the compositions described in Japanese Patent Nos. 2446940 and 2880654 and Japanese Patent Application Laid-open Nos. 278968/1997 and 1515/1998 give, when used as coating agents, solutions having poor stability and being unstorable for a long period of time. Such solutions tend to cause poor applicability, uneven coating and uneven and poor gas-barrier properties.

SUMMARY OF THE INVENTION

Accordingly, an object of the present invention is to provide a process for producing vinyl alcohol polymer compositions having excellent gas-barrier properties, in particular excellent gas-barrier properties under high-humidity conditions.

Another object of the present invention is to provide a coating agent comprising an intermediate product in the above process, said intermediate product having excellent storage stability and being able to yield, according to the above process, vinyl alcohol compositions having excellent gas-barrier properties, in particular excellent gas-barrier properties at high humidities.

Still another object of the present invention is to provide a laminate obtained by applying the above coating agent, said laminate having minimal application unevenness.

Yet another object of the present invention is to provide a gas-barrier material comprising the above laminate as a component, said material having excellent gas-barrier properties, in particular excellent gas-barrier properties under high-humidity conditions.

As a result of an intensive study to solve the above problems, the present inventors found that above and other objects of the present invention can be achieved by providing a process which comprises saponifying a vinyl carboxylate polymer in the presence of a metal alkoxide and/or an oligomer derived from the metal alkoxide, to obtain a vinyl alcohol polymer composition, and then further adding to a solution containing the composition the same or other metal alkoxide and/or oligomer derived therefrom or solutions containing these and removing the solvent, to obtain the desired vinyl alcohol polymer composition. The present invention was completed based on this finding.

The present invention thus provides a process for producing a vinyl alcohol polymer composition, comprising:

providing a reaction liquid comprising a solution containing a vinyl carboxylate polymer and, a first metal alkoxide (I) having at least one functional group and/or an oligomer (I) having at least one functional group obtained from said metal alkoxide (I);

a step of simultaneously effecting (a) saponification of said vinyl carboxylate polymer and (b) reaction in which at least part of the functional groups of said metal alkoxide (I) and/or said oligomer (I) participates, thereby obtaining a vinyl alcohol polymer composition (I); and a step of preparing a solution (A) containing said vinyl alcohol polymer composition (I), followed by adding to the solution (A) a second metal alkoxide (II) and/or an oligomer (II) obtained from the metal alkoxide (II) or another solution (B) containing the metal alkoxide (II) and/or the oligomer (II) derived from the metal alkoxide (II), to prepare an intermediate product solution (C), and then removing the solvent from said solution (C), to produce a vinyl alcohol polymer composition (II).

The present invention further provides a coating agent comprising the intermediate product solution (C) in the above process.

The present invention still further provides a laminate having a layer comprising the vinyl alcohol polymer composition obtained by the above process.

The present invention yet further provides a gas-barrier material comprising the vinyl alcohol polymer composition obtained by the above process.

DETAILED DESCRIPTION OF THE PREFERRED EMBODIMENTS

The present invention is now described in detail.

The process for producing vinyl alcohol polymer compositions according to the present invention comprises the above two steps. In what follows, the above "metal alkoxide (I) and/or oligomer (I) derived from the metal alkoxide (I)" and "metal alkoxide (II) and/or oligomer (II) derived from the metal alkoxide (II)" are sometimes inclusively referred to as "metal alkoxide component (I)" and "metal alkoxide component (II)", respectively.

The metal alkoxide component (I) and metal alkoxide component (II) used in the first and second steps of the process of the present invention is at least one member selected from the group consisting of silicone alkoxides, at least one metal alkoxides other than silicone alkoxides, oligomers derived from silicone alkoxides, oligomers derived from at least one metal alkoxides other than silicone alkoxides, and oligomers derived from silicone alkoxides and at least one metal alkoxides other than silicone alkoxides.

In the present invention, it is desirable, although not limited thereto, to use as at least one component of the metal alkoxide component (I) and metal alkoxide component (II) a silicone alkoxide and/or an oligomer derived from a silicone alkoxide. This use leads to high storage stability of the above solutions (A), (B) and (C) and to good gas-barrier properties under high humidity, little unevenness in the gas-barrier properties and high bending resistance of the resulting vinyl alcohol polymer composition (II). The metal alkoxide component (I) and the metal alkoxide component (II) may be either the same or different.

The above silicone alkoxides preferably have a chemical structure comprising a silicone atom and 2 to 4 alkoxy groups bonded to the silicone atom. The number of the alkoxy groups bonded to the silicone atom is more preferably 3 or 4, particularly preferably 4. Examples of the alkoxy groups are methoxy, ethoxy, propoxy, isopropoxy and butoxy. Where the number of alkoxy groups bonded to the silicone atoms is 2 or 3, the silicone atom is further bonded to an alkyl group (e.g. methyl, ethyl, propyl, isopropyl and butyl), aryl group (e.g. phenyl and naphthyl), halogen atom (e.g. chlorine and fluorine). Preferred examples of the silicone alkoxides are tetramethoxysilane, tetraethoxysilane, methyltrimethoxysilane, ethyltrimethoxysilane, octyltrimethoxysilane, phenyltrimethoxysilane and chlorotrimethoxysilane. Of these, tetramethoxysilane and tetraethoxysilane are most preferred.

The above metal alkoxides, other than silicone alkoxides, preferably have a chemical structure comprising a di- or more valent, more preferably tri- or tetravalent metal atom, e.g., titanium, aluminum and zirconium, and at least one, more preferably at least 2, most preferably at least 3 alkoxy groups bonded to the metal atom. Examples of the alkoxy groups and substituting groups other than alkoxy groups bonded to the metal atom are the same as already given above for silicone alkoxides. Concrete examples of the metal alkoxides are alkoxy titanium compounds, e.g. tetramethoxytitanium, tetraethoxytitanium, tetraisopropoxytitanium and methyltriisopropoxytitanium; alkoxyaluminum compounds, e.g. trimethoxyaluminum, triethoxyaluminum, triisopropoxyaluminum, methyldiisopropoxyaluminum, tributoxyaluminum and diethoxyaluminum chloride; and alkoxyzirconium compounds, e.g., tetraethoxyzirconium, tetraisopropoxyzirconium and methyltriisopropoxyzirconium.

Where excellent gas-barrier properties are strongly desired, good results are often obtained with the metal alkoxide component (I) and metal alkoxide component (II) containing no aryl group or halogen atom. That is, it is desirable to suppress use of, more preferably not to use at all, a metal alkoxide such as phenyltrimethoxysilane or chlorotrimethoxysilane.

The oligomers derived from silicone alkoxides, oligomers derived from at least one metal alkoxides other than silicone alkoxides, and oligomers derived from silicone alkoxides and at least one metal alkoxides other than silicone alkoxides, are obtained by hydrolyzing and condensing by the known process at least one metal alkoxide selected from the group consisting of silicone alkoxides and at least one metal alkoxides other than silicone alkoxides, singly or after mixing of 2 or more types. Examples of the oligomers derived silicone alkoxides are dimer or at least trimer of tetramethoxysilane, dimer or at least trimer of tetraethoxysilane and oligodimethylsiloxane. Of these, dimer or at least trimer of tetramethoxysilane, and dimer or at least trimer of tetraethoxysilane are preferably used. The degree of polymerization of these oligomers is, not necessarily limited though, preferably in a range of 2 to 25, more preferably in a range of 2 to 10.

The above oligomers derived from at least one metal alkoxides other than silicone alkoxides, and oligomers derived from a silicone alkoxide and at least one metal alkoxides other than silicone alkoxides are preferably those obtainable by hydrolyzing and condensing by the usual method one compound alone or a mixture of at least 2 compounds having a chemical structure comprising a silicone and/or a di- or more, more preferably tri- or tetravalent metal atom other than silicone atom, e.g. titanium, aluminum and zirconium, and, bonded thereto, at least one, more preferably at least 2, most preferably at least 3 alkoxy groups. Preferred examples of the oligomers are dimer and at least trimer of tetraisopropoxytitanium. The degree of polymerization of these oligomers is, not necessarily limited though, preferably in a range of 2 to 25, more preferably in a range of 2 to 10.

It is preferable that the weight of the vinyl alcohol polymer compositions (II) after removal of organic components by thermal decomposition be in a range of 10 to 70% by weight, more preferably in a range of 15 to 65% by weight, most preferably in a range of 20 to 60% by weight based on the weight of the vinyl alcohol polymer compositions (II) before the removal. The resulting vinyl alcohol polymer compositions (II) have good gas-barrier properties, little unevenness in the gas-barrier properties and good bending resistance.

It is also desirable that the molar ratio between the metal atom (I) contained in the metal alkoxide component (I) and the metal atom (II) contained in the metal alkoxide component (II) be, in order that the inorganic components generated from the metal alkoxide component (II) will disperse finely and uniformly in the resulting vinyl alcohol polymer composition (II) and that the vinyl alcohol polymer composition will have good gas-barrier properties under high humidity, in a range of 0.01 to 18,000, more preferably in a range of 0.1 to 5,000, still more preferably in a range of 1 to 1,000, and most preferably in a range of 1 to 500.

In the first step of the process of the present invention, the following steps are carried out simultaneously in a reaction mixture comprising a solution containing a vinyl carboxylate polymer and, added thereto, the above metal alkoxide component (I): saponification of the vinyl carboxylate and reaction of at least part of the functional groups present in the metal alkoxide component (I). A vinyl alcohol polymer composition (I) is thereby obtained.

The vinyl carboxylate polymer used in the first step of the process of the present invention is a polymer comprising units from a vinyl carboxylate. It also includes addition polymers of the vinyl carboxylate alone and addition copolymers of the vinyl carboxylate and other comonomers. Preferred examples of vinyl carboxylates are vinyl acetate, vinyl propionate and vinyl 2-methylpropionate, of which vinyl acetate is particularly preferred.

Examples of the comonomers are α-olefins, e.g., ethylene, propylene and 1-butene; vinyl ethers, e.g., methyl vinyl ether, ethyl vinyl ether and t-butyl vinyl ether; allyl alcohol; and vinyltrimethylsilane, of which ethylene is particularly preferred.

Examples of vinyl carboxylate polymers preferably usable for the process of the present invention are polyvinyl carboxylates, e.g. polyvinyl acetate and polyvinyl propionate, and ethylene-vinyl carboxylate copolymers, e.g. ethylene-vinyl acetate copolymer and ethylene-vinyl propionate copolymer, of which polyvinyl acetate and ethylene-vinyl acetate copolymer are particularly preferred.

The use of an ethylene-vinyl carboxylate copolymer as the vinyl carboxylate polymer leads to production of vinyl alcohol polymer compositions (II) having well-balanced gas-barrier properties both under low-humidity and high-humidity conditions and to the solutions (A) and (C) having good storage stability. In view of the above good balance of the gas-barrier properties and good storage stability of the solutions, it is desirable that the content of ethylene units in the used ethylene-vinyl carboxylate copolymer be based on the moles of total monomer units. The content of ethylene units is in a range of 0.5 to 80 mole %, preferably in a range of 1 to 70 mole %, more preferably in a range of 3 to 60 mole %, most preferably in a range of 3 to 25 mole %.

The vinyl carboxylate polymer used in the first step of the process of the present invention may have any degree of polymerization with no specific limitation. The vinyl carboxylate polymer may have a low degree through a high degree of polymerization. However, the vinyl carboxylate polymer preferably has a degree of polymerization in a range of 500 to 10,000, more preferably in a range of 800 to 6,000, most preferably in a range of 1,000 to 3,000, which insures that the resulting vinyl alcohol polymer composition (II) has good gas-barrier properties and excellent mechanical properties and processability.

Besides, the vinyl carboxylate polymer used in the first step of the process of the present invention may, within limits not to impair the effects of the present invention, have been modified by, for example, silyl group-modification or boronic acid-modification. In this case, to ensure that the obtained vinyl alcohol polymer compositions (II) will have less unevenness in the gas-barrier properties, the modification ratio is desirably not more than 1 mole %, more preferably not more than 0.1 mole %, still more preferably not more than 0.01 mole %, most preferably unmodified. It is often the case that, on modification of vinyl carboxylate polymers, no content of double bonds or halogen atoms in the vinyl carboxylate polymers leads to desirable results. This is due to the fact that vinyl carboxylate polymers containing reactable double bonds such as vinyl group and allyl group or halogen atoms will, on saponification, become modified vinyl alcohol polymers, which will then be partially crosslinked by action of these groups or atoms. As a result, the resulting vinyl alcohol polymer compositions (II) tend to have poor storage stability in the form of solutions and do not exhibit gas-barrier properties to high levels.

Furthermore, with the vinyl carboxylate polymer used in the first step, part of the acyloxy groups originating from the vinyl carboxylate monomer units may have been saponified into hydroxyl groups. In this case, in view of the gas-barrier properties of the resulting vinyl alcohol polymer compositions, the saponification degree of the vinyl carboxylate polymer is preferably not more than 50 mole %, more preferably not more than 10 mole %, most preferably not more than 1 mole %.

In the first step of the process of the present invention, the saponification of a vinyl carboxylate polymer produces the corresponding vinyl alcohol polymer. The acyloxy groups originating from the vinyl carboxylate monomer units present in the vinyl carboxylate polymer are converted into hydroxyl groups. At the same time carboxylic acid-based compounds are formed as byproducts (generally, at least one member selected from the group consisting of carboxylic acids, carboxylic acid esters and carboxylic acid salts, although these may differ depending on the types of the organic solvent and catalyst used and like conditions).

On the other hand, the reaction in which at least part of the functional groups contained in the metal alkoxide component (I) participates comprises dehydration and condensation of the functional groups contained in the metal alkoxide component (I). The reaction includes the intra-reaction of the metal alkoxide component (I) and inter-reaction between the vinyl carboxylate polymer and/or saponified products (vinyl alcohol polymer) of the vinyl carboxylate polymer.

By effecting, in the same reaction zone, the above saponification of the vinyl carboxylate polymer and, in parallel therewith, the reaction in which at least part of the functional groups contained in the metal alkoxide component (I) participates, the resulting vinyl alcohol polymer composition (II) has good gas-barrier properties under high-humidity conditions. In the following, the saponification of the vinyl carboxylate polymer and the reaction in which at least part of the functional groups contained in the metal alkoxide component (I) participates are sometimes referred to as "saponification in the first step of the process of the present invention".

During the saponification in the first step of the process of the present invention, it is desirable to use such amounts of the vinyl carboxylate polymer and metal alkoxide component (I) that the metal atom in the metal alkoxide component (I) becomes 0.01 to 75 moles based on 100 moles of the acyl group originating from the vinyl carboxylate monomer unit present in the vinyl carboxylate polymer. The use of at least 0.01 mole of the metal atom in the metal alkoxide component (I) based on 100 moles of the acyl group originating from the vinyl carboxylate monomer unit of the vinyl carboxylate polymer results in good gas-barrier properties under high humidity of the resulting vinyl alcohol polymer composition (II). The use of not more than 75 moles of the metal atom in the metal alkoxide component (I) based on 100 moles of the acyl group ensures that the resulting vinyl alcohol polymer composition (II) has little unevenness (variation in the gas-barrier properties on storage of solution (C)) and can maintain the gas-barrier properties at high level even after exposure to repeated bending. The amount of the metal alkoxide component (I) is desirably set such that the amount of metal atom present in the metal alkoxide component (I) based on 100 moles of the acyl group is a range of 0.01 to 50 moles, more preferably in a range of 0.1 to 20 moles, most preferably in a range of 0.1 to 10 moles. The resulting vinyl alcohol polymer composition (II) achieves a higher level of gas-barrier properties, less property unevenness and maintains its gas-barrier properties at a higher level after exposure to repeated bending.

In the saponification in the first step of the process of the present invention, one can use various catalysts known for the usual saponification. Examples of preferred catalysts are acidic catalysts, e.g. hydrochloric acid, sulfuric acid, p-toluenesulfonic acid, benzoic acid, acetic acid, lactic acid, carbonic acid, oxalic acid and maleic acid; and basic catalysts such as alkali metal hydroxides, e.g. sodium hydroxide and potassium hydroxide, alkali earth metal hydroxides, e.g. magnesium hydroxide and calcium hydroxide, and amines, e.g. ammonia, triethylamine and ethylenediamine. These catalysts may be used either singly or in combination.

To achieve superior coating performance (viscosity and appearance of coating film) of the obtained solution (C) and superior gas-barrier properties of the resulting vinyl alcohol polymer compositions (II), it is generally desirable to use, for the saponification in the first step, a basic catalyst. Particularly preferred is at least one compound selected from alkali metal hydroxides and alkali earth metal hydroxides. More specifically, it is most preferred to use at least one compound selected from the group consisting of sodium hydroxide, potassium hydroxide, calcium hydroxide and magnesium hydroxide. The amount of the catalyst used is, not necessarily restricted though, preferably in a range of 0.001 to 0.1 mole based on the sum of moles (total moles) of the alkoxy group in the metal alkoxide component (I) and the acyl group originating from the vinyl carboxylate monomer unit of the vinyl carboxylate polymer. More preferably the amount of catalyst is 0.01 to 0.08 mole on the same basis.

Where an alkali metal compound and/or alkali earth metal compound such as alkali metal hydroxide and/or alkali earth metal hydroxide is used as a catalyst for saponification in the first step of the process of the present invention, the obtained vinyl alcohol polymer composition (I) sometimes contains as byproducts carboxylic acid salts. These salts can be, for example, alkali metal salts and/or alkali earth metal salts as represented by sodium acetate, potassium acetate, sodium propionate, potassium propionate and the like. To achieve a high storage stability of solutions (A) and (C) and good gas-barrier properties of the resulting vinyl alcohol polymer composition (II), it is desirable that the total amount of such carboxylic acid salts be, not more than 5% by weight, more preferably not more than 2% by weight, most preferably not more than 1% by weight based on the dry weight of the vinyl alcohol polymer composition (I). In order to dry the vinyl alcohol polymer composition (I), vacuum drying or similar known processes can be used. For example vacuum drying at 65° C. for 24 hours is sufficient for the purpose. The content of the carboxylic acid salts can be adjusted by, for example, controlling the amount of catalyst used in the first step, washing the vinyl alcohol polymer composition (I) with an alcohol, a mixed alcohol/water or similar solvents by a known process, and/or similar means.

On effecting saponification in the first step, it is possible, to obtain better results in the gas-barrier properties, solubility and solution stability of the resulting vinyl alcohol polymer composition (II) by controlling the water content in the reaction zone. It is desirable that the water content in the reaction zone based on the weight of the reaction mixture be, although not necessarily limited thereto, in a range of 300 to 200,000 ppm, more preferably in a range of 2,000 to 100,000 ppm, still more preferably in a range of 3,000 to 80,000 ppm, most preferably in a range of 3,000 to 60,000 ppm.

The saponification in the first step of the process of the present invention uses a solution (sol) comprising a vinyl carboxylate polymer and a metal alkoxide component (I) dissolved in an organic solvent. Any organic solvent capable of sufficiently dissolving both the vinyl carboxylate polymer and the metal alkoxide component (I) may be used for this purpose with no particular restrictions. It is however preferred to use an alcohol, e.g. methanol, ethanol, propanol and butanol; an amide, e.g. dimethylformamide and dimethylacetamide; or a sulfoxide, e.g. dimethyl sulfoxide. These solvents may be used either singly or in combination of 2 or more. Among the above, methanol, ethanol, dimethyl sulfoxide and the like are particularly preferred. The amount of the organic solvent used is, not necessarily restricted though, preferably in a range of 20 to 2,000 parts by weight based on 100 parts by weight of the total weight of the vinyl carboxylate polymer and metal alkoxide component (I) used, more preferably in a range of 100 to 1,000 parts by weight on the same basis. Where it is desired to decrease the ratio of the remaining acyl group present in organic polymers (desired product or its intermediates derived on saponification of the vinyl carboxylate polymer used), one may suitably use a homogeneous solvent containing at least 5% by weight of an organic solvent having affinity with the vinyl alcohol polymer generated on saponification of the vinyl carboxylate polymer.

During the saponification, the reaction temperature is, not necessarily restricted though, generally in a range of 20 to 100° C., preferably in a range of 30 to 60° C. The reaction time, which may differ depending on the type and amount the catalyst and other reaction conditions, is generally in a range of 0.01 to 10 hours, preferably in a range of 0.01 to 5 hours, more preferably in a range of 0.02 to 3 hours. The reaction can be performed under any atmosphere with no particular restrictions, and generally performed under air, nitrogen stream or similar atmospheres.

In the process of the present invention, the second step comprises preparing a solution (A) containing the vinyl alcohol polymer composition (I) obtained in the first step, adding to the solution (A) a metal alkoxide (II) and/or an oligomer (II) derived from the metal alkoxide (II), or another solution (B) containing the metal alkoxide (II) and/or the oligomer (II) derived from the metal alkoxide (II), to prepare an intermediate product solution (C), and then removing the solvent from the solution (C), to obtain the desired vinyl alcohol polymer composition (II).

As the solution (A) one can use either the reaction mixture obtained by the saponification of the first step of the present invention as it is, or a solution obtained by adding a solvent to the reaction mixture or by removing the solvent from the reaction mixture to adjust the concentration. The solvent removal can be carried out by any known method, for example, by filtration and evaporation. As the solvent to be added, water and/or sulfoxides such as dimethyl sulfoxide and as necessary other organic solvents can be used. Examples of other organic solvents are the above alcohols and amides that are used during saponification in the first step.

To achieve good storage stability of the solution (C) and good gas-barrier properties of the resulting vinyl alcohol polymer composition (II), it is preferred, to remove the solvent by filtration or similar means from the reaction mixture obtained by the saponification in the first step, wash the obtained solid matter with an alcohol, a mixed alcohol/water or like solvents by the usual procedure, and then add water and/or a sulfoxide such as dimethyl sulfoxide and, as necessary, other organic solvents similar to the above, to prepare the solution (A). This procedure is performed in order to adjust the amount of carboxylic acid salts present in the vinyl alcohol polymer composition (II).

In the second step of the process of the present invention, it is desirable, to select, during the addition of a metal alkoxide component (II) or its solution (B) to the solution (A), an oligomer (II) derived from a metal alkoxide (II) as the metal alkoxide component (II) to be added. It is more preferred to select an oligomer (II) derived from a reaction mixture containing a metal alkoxide (II), an acid catalyst, water and as necessary an organic solvent.

Any known acid catalyst is usable as the acidic catalyst used in the second step. Examples of preferred catalysts are hydrochloric acid, sulfuric acid, nitric acid, p-toluenesulfonic acid, benzoic acid, acetic acid, lactic acid, butyric acid, carbonic acid, oxalic acid and maleic acid. The amount of the acidic catalyst used, which differs depending on the type of the catalyst though, is preferably in a range of 0.00001 to 10 moles based on one mole of the metal atom present in the metal alkoxide component (II), more preferably in a range of 0.0001 to 5 moles on the same basis, most preferably in a range of 0.0005 to 1 mole on the same basis. The amount in this range of the catalyst added leads to much better gas-barrier properties of the resulting vinyl alcohol polymer composition (II) and to better solution stability of solutions (A) and (C).

The amount of water added in the second step differs depending on the type of the metal alkoxide component (II). It is preferably in a range of 0.1 to 10 moles based on one mole of the metal atom present in the metal alkoxide component (II), more preferably in a range of 1 to 4 moles on the same basis and, most preferably in a range of 1.5 to 3 moles on the same basis. The amount in this range of water added leads to particularly better gas-barrier properties of the resulting vinyl alcohol polymer composition (II) and better solution stability of solutions (A) and (C). Where hydrochloric acid or similar water-containing components are used, the amount of fresh water added should be selected taking into consideration the amount of water introduced from that component.

Further in the second step, the reaction mixture may, as necessary, contain an organic solvent. Any organic solvent that can dissolve the metal alkoxide component can be used with no specific limitation. Preferred organic solvents include alcohols, e.g. methanol, ethanol, isopropanol and propanol, among which alcohols having the same alkoxy group as that contained in the metal alkoxide component used are more preferred. For example, methanol for tetramethoxysilane and ethanol for tetraethoxysilane are preferred. The amount of the organic solvent is, not particularly limited though, preferably such that the concentration of the metal alkoxide component (II) is 1 to 90% by weight, more preferably 10 to 80% by weight, and most preferably 20 to 70% by weight.

The reaction temperature in the second step is, not necessarily restricted though, generally in a range of 5 to 100° C., preferably in a range of 10 to 60° C., most preferably in a range of 15 to 50° C. The reaction time, which differs depending on the type and amount the catalyst and other reaction conditions, is generally in a range of 0.01 to 60 hours, preferably in a range of 0.1 to 12 hours, more preferably in a range of 0.1 to 6 hours. The reaction can be performed under any atmosphere with no particular restrictions, and generally performed under air, nitrogen stream or similar atmospheres.

In the process of the present invention, a metal alkoxide component (I) and a metal alkoxide component (II) should, in the first step and second step, be each added at least once. In these 2 steps, the number of additions of the metal alkoxide component (I) or the metal alkoxide component (II) is not limited to once per step. However, the metal alkoxide components may be added dividedly twice or more times per step. In this case, the amount added at each addition of the metal alkoxide component (I) or metal alkoxide component (II) is preferably such that the total addition of the metal alkoxide component (I) or metal alkoxide component (II) falls within the above mentioned desirable range.

It is desirable to adjust the pH of the solution (C). The adjustment ensures that the resulting vinyl alcohol polymer composition (II) has better gas-barrier properties. The pH of the solution (C) is preferably in a range of 1.0 to 8.0, more preferably in a range of 1.0 to 6.0, and most preferably in a range of 1.5 to 4.0.

The pH of the solution (C) can be adjusted by known methods, for example by addition of an acidic compound such as hydrochloric acid, nitric acid, acetic acid, butyric acid or ammonium sulfate and/or a basic compound such as sodium hydroxide, potassium hydroxide, ammonia, trimethylamine, sodium carbonate or sodium acetate.

With the reaction according to the present invention, one may, as necessary, add a metal salt, metal complex, layered clay compound, crosslinking agent, vinyl alcohol polymer and other polymers, plasticizer, antioxidant, UV absorber, flame-retardant and like additives to the reaction zone, within limits not to impair the effect of the present invention. Examples of the metal salt and metal complex are: fine particles of metal oxides produced by hydrolyzing and polycondensing by wet process the above metal alkoxides; fine particles of metal oxides produced by hydrolyzing and polycondensing by dry process, or baking; fine particles of silica prepared from water glass; metal salts of inorganic acids, e.g. carbonate, chloride and nitrate; metal salts of organic acids, e.g. oxalate; and metal complexes, e.g. acetylacetonate metal complexes such as aluminum acetylacetonate, cyclopentadienyl metal complexes and cyano metal complexes.

Examples of the layered clay compound are natural smectite as represented by montmorillonite, synthetic smectite, natural mica, synthetic mica, hydrotalcite, and talc, as well as organically modified smectite and organically modified synthetic mica. Among the above, particularly preferred layered clay compounds are montmorillonite and synthetic mica. Addition of these layered clay compounds in an amount of 0.5 to 30 parts by weight based on the weight of the vinyl alcohol polymer composition (II) improves the gas-barrier properties, in particular the water vapor-barrier property and is hence desirable. The amount of the layered clay compound is more preferably 1 to 20 parts by weight. The layered clay compound is preferably added to the solution (C) without impairing the gas-barrier properties.

As the above crosslinking agent, any one generally used for vinyl alcohol polymers can be used with no particular limitation. Specific examples of the crosslinking agent are aldehydes, e.g. formaldehyde and glutaraldehyde; acetals, e.g. diacetalized product of glutaraldehyde; methylolureas, e.g. methylolurea and methylolmelamine; carboxyl group-containing polymers, e.g. acrylic acid-based polymers and malefic anhydride-based polymers; boric acid and titanium lactate. Of the above, it is preferable to add a carboxylic group-containing polymer such as acrylic acid-based polymer or maleic anhydride-based polymer and/or titanium lactate, which addition improves the water resistance, boiling resistance and retort resistance of the resulting vinyl alcohol polymer composition (II). The amount of the crosslinking agent added depends on the type of the crosslinking agent and is generally 0.5 to 50 parts by weight based on the weight of the vinyl alcohol polymer composition (II), more preferably 1 to 40 parts by weight on the same basis, and most preferably 1 to 30 parts by weight on the same basis. It is desirable to add the crosslinking agent to the solution (C), without impairing the gas-barrier properties of the vinyl alcohol polymer composition (II).

The known sol-gel process often uses a coupling agent, such as γ-glycidoxypropyltrimethoxysilane, γ-glycidoxypropylmethyldimethoxysilane or γ-aminopropyltrimethoxysilane, which comprises at least 2 functional groups bonded via an alkylene group, in order to increase the dispersibility of the metal oxide in the resulting composition. In contrast, better results are often obtained by using no coupling agent of this type, because it would act against improvement of the gas-barrier properties under high-humidity conditions.

The vinyl alcohol polymer composition (II) is obtained by removing the solvent from the solution (C). During removal of the solvent, several reactions proceed in the components contained in the solution (C). These reactions include hydrolysis and condensation inside each of and between the vinyl alcohol polymer composition (I) and metal alkoxide component (II) present in the solution (C).

Any process with no specific limitation can remove the solvent. However, it is desirable to remove the solvent by heating with hot air or the like. The heating temperature for the removal of the solvent is preferably in a range of 30 to 200, more preferably in a range of 50 to 150° C. The drying time is preferably in a range of 0.001 to 60 hours, more preferably in a range of 0.002 to 10 hours, most preferably in a range of 0.002 to 1 hour. The solvent removal can be performed under any atmosphere with no specific restrictions, for example, under air, nitrogen stream or similar atmospheres.

The vinyl alcohol polymer compositions (II) may, as necessary, be heated treated. The heat treatment can be carried out at any time after the solvent removal from the solution (C) has been almost complete. The treating temperature is preferably in a range of 50 to 250° C., and more preferably in a range of 60 to 200° C.

The vinyl alcohol polymer compositions (II) may also be subjected to UV irradiation. The irradiation can be carried out at any time after the solvent removal from the solution (C) has been almost complete, and by any known method with no specific restrictions. The wavelength of the UV irradiated is preferably in a range of 170 to 250 nm, more preferably in a range of 170 to 190 nm and/or in a range of 230 to 250 nm. Either one or both of the heat treatment and UV irradiation may be employed. The heat treatment and/or UV irradiation permit higher levels of the gas-barrier properties of the vinyl alcohol polymer compositions (II), as well as laminates and gas-barrier materials utilizing the vinyl alcohol polymer compositions (II).

In the second step of the process of the present invention, the vinyl alcohol polymer compositions (II) having a prescribed shape, such as film and sheet, can be produced by placing the solution (C), that is an intermediate product of the second step, in a mold having the prescribed shape. Besides, fiber-form vinyl alcohol polymer compositions (II) can be produced by spinning the above solution (C) according to a known spinning process and, as necessary, permitting the reaction to continue by heat treatment, UV irradiation or like means. Preferred spinning processes include wet spinning and dry-wet spinning, as well as impregnation of a fibrous structure with the solution (C) and/or application of the solution (C) onto a fibrous structure.

The film- or sheet-formed vinyl alcohol polymer compositions (II) can be subjected to dry lamination, wet lamination or similar lamination processes, with a base having a prescribed shape, to give laminates with the base. Examples of the base include polymers, such as polyolefins, e.g. polyethylene (hereinafter sometimes referred to as "PE") and polypropylene (hereinafter sometimes referred to as "PP"); polyesters, e.g. polyethylene terephthalate (hereinafter sometimes referred to as "PET"), polybutylene terephthalate (hereinafter sometimes referred to as "PBT") and polyethylene naphthalate (hereinafter sometimes referred to as "PEN"); polyamides, e.g. nylon6 (hereinafter sometimes referred to as "Ny6") and nylon66 (hereinafter sometimes referred to as "Ny66"); polyvinyl chloride and polyurethanes; paper; metal oxides; and metals.

The microscopic phase-separation structure of the vinyl alcohol polymer compositions (II) obtained by the process of the present invention is, not necessarily limited though, in many cases as follows. That is, the structure comprises the vinyl alcohol polymer formed by saponification of the vinyl carboxylate polymer and the metal oxide formed by polycondensation of the metal alkoxide component, each co-continuously extending; or comprises a co-continuous structure comprising a sea-islands structure where the sea component is formed by the vinyl alcohol polymer and the islands component is formed by the metal oxide into which the vinyl alcohol polymer has penetrated. Of these, it is desirable that the structure comprises the vinyl alcohol polymer and metal oxide, each co-continuously extending, which insures better gas-barrier properties.

The solution (C) obtained by the process of the present invention is usable as a coating agent. In this case, the solid matter concentration of the solution (C) is, not necessarily limited though, preferably in a range of 0.1 to 40% by weight, more preferably in a range of 0.5 to 20% by weight, most preferably in a range of 1 to 12% by weight. With the solid matter concentration being in a range of 0.1 to 40% by weight, coating films obtained by application of the solution (C) mostly have better gas-barrier properties. If the solid matter concentration exceeds 40% by weight, the solution (C) will tend to have poor storage stability. On the other hand, if the concentration is less than 0.1% by weight, there will tend to occur uneven coating, resulting in uneven gas-barrier properties of the coating film. Although the vinyl alcohol polymer composition (II) can be used as a powdery paint (in solid state), it is desirable to use it in a solution form obtained midway the reaction, which insures better gas-barrier properties. On use in a solution state, in order to adjust the viscosity, the solution may, before application, be thickened by heating or addition of a catalyst or diluted with water, an alcohol such as methanol, ethanol or isopropanol, dimethyl sulfoxide or similar solvents. Where it is desired to decrease the content of organic solvent components in the coating agent, part of or entire organic solvents can be removed by evaporation under reduced pressure or similar means, before application.

Where the solution (C) is used as a coating agent, it should be noted that the reaction mixture changes its condition during the course of the reaction and forms a gel-like composition at the final stage. It is therefore suitable to optimize, within the ranges specified in the present invention, the composition of the reaction mixture such that the solution viscosity becomes, even after being allowed to stand still at 25° C. for 10 days after the addition of all the amount of the metal alkoxide component used, not more than 1 N·s/m$^2$, more preferably not more than 0.1 N·s/m$^2$, most preferably not more than 0.1 N·S/m$^2$, as determined with a Brookfield viscosimeter (type B: 60 rpm). It is more desirable to optimize the composition such that the solution viscosity becomes, even after being allowed to stand still at 50° C. for 10 days, not more than 1 N·s/m$^2$, more preferably not more than 0.1 N·s/m$^2$, still more preferably not more than 0.05 N·s/m$^2$. It is even more desirable to optimize the composition such that the solution viscosity becomes, even after being allowed to stand still at 50° C. for 30 days, not more than 1 N·s/m$^2$, more preferably not more than 0.1 N·s/m$^2$, most preferably not more than 0.05 N·s/m$^2$. Good storage stability of the coating agent in most cases leads to better gas-barrier properties of the composition obtained after coating.

Optimization of the composition of the coating agent such that the solution viscosity value falls within the above range is preferably carried out by, for example, decreasing the solid matter concentration, adjusting the pH or similar means.

During the use of the solution (C) in the second step of the process of the present invention, one can impregnate a base comprising a fibrous aggregate such as fabric, paper or wood with the solution (C) and then permit the reaction to proceed, to obtain a complex comprising the fibrous aggregate base impregnated with the vinyl alcohol polymer composition (II). Or, one can coat a base film or shaped matter having a prescribed shape comprising a polymer such as polyolefin, e.g. PE and PP; a polyester, e.g. PET, PBT and PEN; a polyamide, e.g. Ny6 and Ny66; polyvinyl chloride or a polyurethane; paper, a metal oxide or a metal, and then permit the reaction to continue, to obtain a laminate having a coating film comprising the vinyl alcohol polymer composition (II). Preferred examples of the above laminate are those comprising at least one layer construction selected from the group consisting of polyester/vinyl alcohol polymer composition (II), polyamide/vinyl alcohol polymer composition (II) and polyolefin/vinyl alcohol polymer composition (II), preferably those comprising a layer construction of polyester/vinyl alcohol polymer composition (II)/polyamide or polyamide/vinyl alcohol polymer composition (II). Specific examples of the above are polyester/vinyl alcohol polymer composition (II)/polyolefin, polyamide/vinyl alcohol polymer composition (II)/polyolefin, polyolefin/vinyl alcohol polymer composition (II)/polyolefin, polyester/vinyl alcohol polymer composition (II)/polyamide/polyolefin, polyester/vinyl alcohol polymer composition (II)/polyester/polyolefin, polyamide/vinyl alcohol polymer composition (II)/polyester/polyolefin, vinyl alcohol polymer composition (II)/polyester/polyamide/polyolefin, polyolefin/paper/polyolefin/vinyl alcohol polymer composition (II)/polyolefin, and vinyl alcohol polymer composition (II)/polyvinyl chloride/paper. Among the above, polyester/vinyl alcohol polymer composition (II)/polyolefin, polyamide/vinyl alcohol polymer composition (II)/polyolefin, polyester/vinyl alcohol polymer composition (II)/polyamide/polyolefin, polyester/vinyl alcohol polymer composition (II)/polyester/polyolefin and polyamide/vinyl alcohol polymer composition (II)/polyester/polyolefin are preferred; and polyamide/vinyl alcohol polymer composition (II)/polyolefin, polyester/vinyl alcohol polymer composition (II)/polyamide/polyolefin and polyamide/vinyl alcohol polymer composition (II)/polyester/polyolefin are more preferred. In view of the mechanical properties of the resulting laminates, it is desirable to use PET as polyester and Ny6 as polyamide.

In order to form a film comprising the solution (C) on a base, any known process can be used such as casting, dipping, roll coating, spraying or screen printing. Laminates with metal or metal oxide can be obtained in a similar manner. During the lamination, a known undercoating agent or adhesive may be used according to the type of the base used.

The vinyl alcohol polymer compositions (II) obtained by the process of the present invention have excellent barrier properties against oxygen, water vapor, carbon dioxide, nitrogen and similar gases, and can maintain the excellent barrier properties at high levels under high-humidity conditions and after exposure to repeated bending. The vinyl alcohol polymer compositions (II) obtained by the process of the present invention are particularly useful as packaging materials such as food-packaging materials, which are required to exhibit good gas-barrier properties independent of the surrounding conditions including high humidity and to maintain the good barrier properties even after exposure to repeated bending. Furthermore, laminates comprising films comprising the vinyl alcohol polymer compositions (II), that are produced by application onto a base film and then permitting the reaction to proceed, can also maintain their excellent gas-barrier properties under high-humidity conditions or after exposure to repeated bending. Hence they are suitably used as packaging materials such as packaging films for foods.

Having generally described this invention, a further understanding can be obtained by reference to certain specific examples which are provided herein for purposes of illustration only, and are not intended to be limiting unless otherwise specified.

EXAMPLES

In the Examples and Comparative Examples that follow, the "%" and "parts" mean "% by weight" and "parts by weight", respectively, unless otherwise specified; the measurements or evaluations were made by the following methods (1) through (8).

(1) Amount of acyl group

The vinyl carboxylate polymers (polyvinyl acetate, polyvinyl propionate, ethylene-vinyl acetate copolymer and the like) and the compositions obtained by saponification thereof were tested for the monomer composition of each polymer by 270 MHZ $^1$H-NMR (with JNM-GSX270, made by JEOL Ltd.), and the content of the acyl group of the polymer and the ratio of the acyl group remaining after saponification were quantitatively determined from the results.

With a composition obtained by saponification, a small amount of sample was taken from the composition, dried in order to remove low-boiling substances such as solvent and weighed. The sample was then dissolved in deuterated dimethyl sulfoxide and, in the presence of a standard (tetramethoxysilane) with known amount (moles), analyzed by 270 MHZ $^1$H-NMR (with JNM-GSX270, made by JEOL Ltd.). Among monomer units contained in the polymer, those originated from vinyl carboxylate units include unreacted vinyl carboxylate units, vinyl alcohol units, monomer units having a structure comprising a vinyl alcohol unit and, chemically bonded thereto, a metal oxide component, and the like (hereinafter these monomer units are inclusively referred to as "monomer units originating from vinyl carboxylate"). The moles of total acyl groups (acetyl group, propionyl group and the like) contained per unit weight of the composition sample and the moles of the monomer units originating from vinyl carboxylate and contained per unit weight of the composition are determined. The ratio between the two was taken as the ratio of remaining acyl group (mole %).

Where an alkali metal hydroxide or alkali earth metal compound had been used as a catalyst for the saponification of the vinyl carboxylate polymer, the carboxylic acid salt byproduct product from the saponification cannot be removed by simple drying. In this case, at first the moles of the acyl group originating from the carboxylic acid salt and contained in the unit weight of the composition was calculated from the weight ratio of the carboxylic acid salt to the composition determined by the method described below, and then the moles of the acyl group originating from the carboxylic acid salt was subtracted from the moles of total acyl groups in the composition determined by the above $^1$H-NMR, to obtain the moles of the acyl group present as bonded to the polymer contained in the unit weight of the composition. The ratio between the obtained moles and the moles of the monomer units originating from the vinyl carboxylate contained in the unit weight of the composition was taken as the ratio (mole %) of acyl group remaining after the saponification.

(2) Amount of carboxylic acid salt

A small amount of sample was taken from the composition obtained by saponification of a vinyl carboxylate polymer. The sample was placed in a platinum crucible and, after being treated in an electric furnace (600° C.), tested with a polarization Zeeman atomic absorption spectrophotometer (Z-5300, made by Hitachi, Ltd.) for the content of the metal atom contained in the obtained ash. On supposing that the metal atom was present, in the composition, in the form of the carboxylic acid salt byproduct produced by the saponification, the content by weight (unit: % by weight) of the carboxylic acid salt in the vinyl alcohol polymer composition obtained by the saponification was calculated. The weight of the vinyl alcohol polymer composition was measured on the dry sample from which the solvent had been removed by vacuum drying at 65° C. for 24 hours.

(3) Storage stability

After a solution of a vinyl alcohol polymer composition to be used for producing single-layer film-shape compositions or laminates had been prepared, (where the present invention applies, on production of a vinyl alcohol polymer composition (II), after all addition of a metal alkoxide component (II) or its solution (B) to the solution (A) had been complete,) the solution was allowed to stand at 25° C. for 1 day, at 25° C. for 10 days, at 50° C. for 10 days, or at 50° C. for 30 days. The solutions were tested with a Brookfield viscosimeter (type B, rotations 60 rpm) for viscosity. The results were rated as "excellent" (⊚) for viscosity values not more than 0.05 N·s/m$^2$, "good" (O) for more than 0.05 N·s/m$^2$ and not more than 0.1 N·s/m$^2$, "normal" (Δ) for more than 0.1 N·s/m$^2$ and not more than 1 N·s/m$^2$, "poor" (Δ~X) for more than 1 N·s/m$^2$ and "bad" (X) for solutions having gelled and being undissolvable into solutions.

(4) Gas-barrier properties

After a solution of a vinyl alcohol polymer composition to be used for producing single-layer film-shape compositions or laminates had been prepared, (where the present invention applies, on production of a vinyl alcohol polymer composition (II), after all addition of a metal alkoxide component (II) or its the solution (B) to the solution (A) had been complete,) the solution was allowed to stand at 25° C. for 1 day, and then subjected to a drying step (or, where used as a coating agent, a coating step) and the succeeding steps, to yield a single-layer film-shape composition or laminate. Ten samples were taken from optional positions from the surface of the obtained film or laminate, and tested with an oxygen transmission rate tester (MOCON OX-TRAN2/20, made by Modem Control Co.) for the oxygen transmission rate (unit: cc·20 μm/m$^2$·24 hr·atm) under the conditions of a temperature of 20° C., a humidity of 95% and an oxygen pressure of 2.5 kg/cm$^2$. The smallest value of the obtained 10 data was taken as the oxygen transmission rate of the composition.

(5) Property unevenness

After a solution of a vinyl alcohol polymer composition to be used for producing single-layer film-shape compositions or laminates had been prepared, (where the present invention applies, on production of a vinyl alcohol polymer composition (II), after all addition of a metal alkoxide component (II) or its the solution (B) to the solution (A) had been complete,) the solution was allowed to stand at 25° C. for 1 day or at 40° C. for 10 days, and then subjected to a drying step (or, where used as a coating agent, a coating step) and the succeeding steps, to yield a single-layer film-shape composition or laminate. Ten samples were taken from optional positions of the surface of the obtained film or laminate, and tested with an oxygen transmission rate tester (MOCON OX-TRAN2/20, made by Modern Control Co.) for the oxygen transmission rate (unit: cc·20 μm/m$^2$·24 hr·atm) under the conditions of a temperature of 20° C., a humidity of 95% RH and an oxygen pressure of 2.5 kg/cm$^2$. Based on the average of the oxygen transmission rate values of the samples having been allowed to stand at 25° C. for 1 day, the number of samples having been allowed to stand at 40° C. for 10 days and showing an oxygen transmission rate of at least twice the above average is taken as "property unevenness".

(6) Bending resistance

After a solution of a vinyl alcohol polymer composition to be used for producing single-layer film-shape compositions or laminates had been prepared, (where the present invention applies, on production of a vinyl alcohol polymer composition (II), after all addition of a metal alkoxide component (II) or its the solution (B) to the solution (A) had been complete,) the solution was allowed to stand at 25° C. for 1 day, and then subjected to a drying step (or, where used as a coating agent, a coating step) and the succeeding steps, to yield a single-layer film-shape composition or laminate. One hundred samples of 120 mm×120 mm were taken from the obtained single-layer film or laminate, and repeatedly bent, in accordance with JIS-P8114 (1998) except for the specimen thickness, by moving a blade forward and backward 10 times, at a temperature of 20° C. and under a humidity of 85% RH. The samples obtained after the bending test were tested with an oxygen transmission rate tester (MOCON OX-TRAN2/20, made by Modem Control Co.) for the oxygen transmission rate (unit: cc·20 $\mu$m/m$^2$·24 hr·atm) under the conditions of a temperature of 20° C., a humidity of 95% RH and an oxygen pressure of 2.5 kg/cm$^2$. Based on the oxygen transmission rate value of a sample showing the best gas-barrier property (smallest oxygen transmission rate), the number of samples showing an oxygen transmission rate of at least 10 times the smallest value was checked. It can be judged that the smaller the ratio of the number of the samples showing at least 10 times the smallest value to the total number (100 sheets) of samples, the better the bending resistance.

(7) Appearance

The single-layer film-shape composition or laminate prepared for the above gas-barrier properties was visually checked for the transparency, color and surface condition of the layer (cast film or coating film) comprising the vinyl alcohol polymer composition. A colorless transparent layer with good surface condition was judged "good (◎)" and an opaque or colored layer or a layer with poor surface conditions such as uneven thickness or roughened surface is judged "bad (X)".

(8) Weight after removal of organic components

After a vinyl alcohol polymer composition to be used for producing single-layer film-shape compositions or laminates had been prepared, (where the present invention applies, on production of a vinyl alcohol polymer composition (II), after removal of the solvent from the solution (C) obtained by adding a metal alkoxide component (II) or its the solution (B) to the solution (A),) a small amount of sample was taken from the composition. The sample was, after being vacuum dried, weighed, and, after further removal of organic components by thermal decomposition, weighed again. The weight change (unit: % by weight) before and after removal of organic components was calculated.

The vacuum drying was performed by vacuum drying at 65° C. for 24 hours, and the thermal decomposition by placing the dried composition in a platinum crucible, then heating in an electric furnace under air atmosphere from room temperature up to 600° C. over 1 hour, and finally heating at 600° C. for 5 hours under the same atmosphere.

Example 1

There was dissolved 100 parts by weight of a polyvinyl acetate having a degree of polymerization of 1,700 in 150 parts by weight of methanol. To the solution 4.4 parts by weight of tetramethoxysilane and a small amount of distilled water were added, and 46 parts by weight of a 4% sodium hydroxide /methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 4.1 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the polyvinyl acetate of 0.5 mole %, an amount of remaining sodium acetate of 0.5% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 125 parts by weight of tetramethoxysilane was dissolved in 90 parts by weight of methanol. To the solution, 20 parts by weight of distilled water and 8.2 parts by weight of 1N(normal)-hydrochloric acid were added to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an oriented PET film (hereinafter sometimes referred to as "OPET") having a thickness of 12 $\mu$m with a bar coater to a thickness after drying of 2 $\mu$m. The films were then dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 2

There was dissolved 100 parts by weight of an ethylenevinyl acetate copolymer (ratio 20 of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.5 mole %, an amount of remaining sodium acetate of 0.4% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 3

There was dissolved 100 parts by weight of an ethylenevinyl acetate copolymer (ratio of ethylene modification: 32 mole %) having a degree of polymerization of 500 in 150 parts by weight of methanol. To the solution 7.6 parts by weight of tetramethoxysilane and a small amount of distilled water were added, and 32 parts by weight of a 10% sodium hydroxide/methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 7.2 parts by weight of methyl acetate and washing 3 times with 1,000 parts by weight of a 50% aqueous methanol solution, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.2 mole %, an amount of remaining sodium acetate of 0.2% by weight and an amount of Si atom of 5 moles based on 100 moles of the acyl group originating from the vinyl carboxylate unit. The vinyl alcohol polymer composition (I) was dissolved in a mixed distilled water/isopropanol (ratio by weight: 50/50) to give a solution having a solid matter concentration of 10% by weight. Next, 90 parts by weight of tetramethoxysilane was dissolved in 80 parts by weight of methanol. To the solution, 6.0 parts by weight of distilled water and 15 parts by weight of 2N-hydrochloric acid were added, to prepare a sol. The sol was subjected to reaction with stirring at 40° C. for 1 hour. The sol thus obtained was diluted with 100 parts by weight of distilled water and, quickly thereafter, the obtained mixture was added, with stirring, to the above 10% vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160 for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 4

There was dissolved 100 parts by weight of an ethylene-vinyl acetate copolymer (ratio of ethylene modification: 5 mole %) having a degree of polymerization of 600 in 150 parts by weight of methanol. To the solution 1.2 parts by weight of tetraethoxysilane and a small amount of distilled water were added, and 68 parts by weight of a 4% sodium hydroxide/methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.1 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.2 mole %, an amount of remaining sodium acetate of 0.2% by weight and an amount of Si atom of 0.5 mole based on 100 moles of the acyl group originating from the vinyl carboxylate unit. The vinyl alcohol polymer composition (I) was dissolved in distilled water to give an aqueous solution having a solid matter concentration of 20% by weight.

Next, 179 parts by weight of tetraethoxysilane was dissolved in 260 parts by weight of ethanol. To the solution, 22 parts by weight of distilled water and 8.6 parts by weight of 1N-hydrochloric acid were added, to prepare a sol. The sol was subjected to reaction with stirring at 40° C. for 1 hour. The sol thus obtained was diluted with 500 parts by weight of distilled water and, quickly thereafter, the obtained mixture was added, with stirring, to the above 20% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are as shown in Table 2.

Example 5

There was dissolved 100 parts by weight of a polyvinyl acetate having a degree of polymerization of 1,700 in 150 parts by weight of methanol. To the solution 26.4 parts by weight of tetramethoxysilane and a small amount of distilled water were added, and 18.5 parts by weight of a 10% sodium hydroxide /methanol solution was added to the mixture with stirring, to prepare a reaction liquid having a water content of 0.09 by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 4.2 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the polyvinyl acetate of 0.2 mole %, an amount of remaining sodium acetate of 0.4% by weight and an amount of Si atom of 15 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 103 parts by weight of tetramethoxysilane was dissolved in 260 parts by weight of isopropanol. To the solution, 5.5 parts by weight of distilled water and 13.6 parts by weight of 1N-hydrochloric acid were added to prepare a sol. The sol was subjected to reaction with stirring at 40° C. for 1 hour. The sol thus obtained was diluted with 450 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were then dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are as shown in Table 2.

Example 6

There was dissolved 100 parts by weight of an ethylene-vinyl acetate copolymer (ratio of ethylene modification: 8 mole %) having a degree of polymerization of 550 in 100 parts by weight of methanol. To the solution 4.3 parts by weight of tetramethoxysilane and a small amount of distilled water were added, and 36 parts by weight of a 10% sodium hydroxide/methanol solution was added to the mixture with stirring, to prepare a reaction liquid having a water content of 0.09 by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 8.1 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.2 mole %, an amount of remaining sodium acetate of 0.4% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 40 parts by weight of tetramethoxysilane was dissolved in 50 parts by weight of methanol. To the solution, 4 parts by weight of distilled water and 5.3 parts by weight of 1N-hydrochloric acid were added, to prepare a sol. The sol was subjected to reaction with stirring at 40° C. for 1 hour. The sol thus obtained was diluted with 50 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160 for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are as shown in Table 2.

Example 7

There was dissolved 100 parts by weight of an ethylene-vinyl acetate copolymer (ratio of ethylene modification: 44 mole %) having a degree of polymerization of 1,700 in 100 parts by weight of methanol. To the solution 1.9 parts by weight of triisopropoxyaluminum and a small amount of distilled water were added, and 55 parts by weight of a 4% sodium hydroxide/methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 4.9 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.2 mole %, an amount of remaining sodium acetate of 0.4% by weight and an amount of Al atom of 1.0 mole based on 100 moles of the acyl group originating from the vinyl carboxylate unit. The vinyl alcohol polymer composition (I) was dissolved in a mixed distilled water/isopropanol (ratio by weight: 40/60) liquid to give a solution having a solid matter concentration of 10% by weight. Next, 126 parts by weight of tetramethoxysilane was dissolved in 100 parts by weight of methanol. To the solution, 15 parts by weight of distilled water and 6.1 parts by weight of 1N-hydrochloric acid were added, to prepare a sol. The sol was subjected to reaction with stirring at 40° C. for 1 hour. The sol thus obtained was diluted with 200 parts by weight of a mixed distilled water/isopropanol (ratio by weight: 50/50) liquid and, quickly thereafter, the obtained mixture was added, with stirring, to the above 10% vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 8

There was dissolved 100 parts by weight of an ethylene-vinyl acetate copolymer (ratio of ethylene modification: 3 mole g) having a degree of polymerization of 1,700 in 100 parts by weight of methanol. To the solution 4.36 parts by weight of tetramethoxysilane and a small amount of distilled water were added, and 64 parts by weight of a 5% potassium hydroxide/methanol solution was added to the mixture with stirring, to prepare a reaction liquid having a water content of 0.09% by weight. The liquid was subjected to reaction at 40° C. for 10 minutes to yield a gel. The gel was pulverized and in 1,500 parts by weight of methanol, further permitted to continue reaction at 60° C. for 4 hours. Thereafter, the reaction mixture was neutralized by adding 5.1 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.2 mole %, an amount of remaining potassium acetate of 0.5% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 156 parts by weight of tetramethoxysilane was dissolved in 100 parts by weight of methanol. To the solution, 26 parts by weight of distilled water and 10.2 parts by weight of 1N-nitric acid were added, to prepare a sol. The sol was subjected to reaction with stirring at 40° C. for 5 hours. The sol thus obtained was diluted with 200 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 9

There was dissolved 100 parts by weight of a polyvinyl propionate having a degree of polymerization of 550 in 150 parts by weight of methanol. To the solution 3.8 parts by weight of tetramethoxysilane and a small amount of distilled water were added, and 50 parts by weight of a 4% sodium hydroxide /methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 4.4 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the polyvinyl propionate of 0.9 mole %, an amount of remaining sodium propionate of 0.6% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 108 parts by weight of tetramethoxysilane was dissolved in 100 parts by weight of methanol. To the solution, 16 parts by weight of distilled water and 7.1 parts by weight of 1N-hydrochloric acid were added, to prepare a sol. The sol was subjected to reaction with stirring at 40° C. for 1 hour. The sol thus obtained was diluted with 150 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 2.

Example 10

There was dissolved 100 parts by weight of a modified polyvinyl acetate copolymerized with 0.5 mole % of vinyltriethoxysilane and having a degree of polymerization of 550 in 150 parts by weight of methanol. To the solution 3.6 parts by weight of tetramethoxysilane and a small amount of distilled water were added, and 23 parts by weight of a 101% sodium hydroxide /methanol solution was added to the mixture with stirring, to prepare a reaction liquid having a water content of 0.09% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 5.1 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the modified polyvinyl acetate of 0.9 mole %, an amount of remaining sodium acetate of 0.6% by weight and an amount of Si atom of 2.0 moles based on 100 moles of the acyl group originating from the vinyl carboxylate unit (the 2.0 moles of Si atom contained 0.5 mole of Si atom originating from the vinyltriethoxysilane). The vinyl alcohol polymer composition (I) was dissolved in distilled water to give an aqueous solution having a solid matter concentration of 10% by weight.

Next, 55 parts by weight of tetramethoxysilane was dissolved in 100 parts by weight of methanol. To the solution, 6.4 parts by weight of distilled water and 2.6 parts by weight of 1N-hydrochloric acid ware added, to prepare a sol. The sol was subjected to reaction with stirring at 40° C. for 1 hour. The sol thus obtained was diluted with 150 parts by weight of distilled water and, quickly thereafter, the obtained mixture was added, with stirring, to the above 10% aqueous vinyl alcohol polymer composition (I) solution. The resulting mixed solution showed a storage stability as shown in Table 2.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition (II)/OPET (2 μm/12 μm) laminates with a colorless, transparent coating film having a good appearance. The results of evaluation on the gas-barrier properties of the obtained laminates are shown in Table 2.

Example 11

Example 2 was repeated except that 10 parts by weight of 1N-hydrochloric acid was further added to the mixed solution obtained in Example 2. The results of evaluation on the storage stability and gas-barrier properties are shown in Table 2.

Example 12

Example 2 was repeated except that, instead of coating the 12 μm-thick OPET with the solutions to a thickness after drying of 2 μm, the solutions were each flown in a polytetrafluoroethylene (TEFLON, made by du Pont Co.) container and, after drying and heat treating, the obtained films were peeled off from the polytetrafluoroethylene container, to prepare colorless, transparent single-layer film-shape vinyl alcohol polymer compositions (II) having a good appearance. The results of evaluation on the storage stability and gas-barrier properties are shown in Table 2.

Example 13

Example 2 was repeated except that methanol was changed to a mixed methanol/distilled water to change the water content of the reaction liquid to 5% by weight, to prepare a mixed reaction solution and, further, colorless, transparent vinyl alcohol polymer compositions (II). The results of evaluation on the storage stability and gas-barrier properties of these products are shown in Table 2.

The compositions and conditions employed in Examples 1 through 13 are summarized in Table 1.

TABLE 1

| Example | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| The 1st step | | | | | | | | | | | | | |
| Metal alkoxide (I) | TMOS | TMOS | TMOS | TMOS | TMOS | TMOS | TMOS | TMOS | TMOS | TMOS | TMOS | TMOS | TMOS |
| ($*10^{-2}$ mole) | 2.5 | 2.5 | 5.0 | 0.5 | 1.5 | 2.5 | 1.0 | 2.5 | 2.5 | 1.5 | 2.5 | 2.5 | 2.5 |
| Degree of polymerization | 1700 | 500 | 500 | 600 | 1700 | 550 | 1700 | 1700 | 550 | 550 | 500 | 500 | 500 |
| Ratio of ethylene Modification (mole %) | 0 | 8 | 32 | 5 | 0 | 8 | 44 | 3 | 0 | 0 | 8 | 8 | 8 |
| Water content (% by weight) | 0.09 | 0.09 | 0.09 | 0.09 | 0.09 | 0.09 | 0.09 | 0.09 | 0.09 | 0.09 | 0.09 | 0.09 | 5 |
| Ratio of remaining acyl group (mole %) | 0.5 | 0.5 | 0.2 | 0.2 | 0.2 | 0.2 | 0.2 | 0.2 | 0.9 | 0.9 | 0.5 | 0.5 | 0.50.6 |
| Content of carboxylic acid salt (% by weight) | 0.5 | 0.4 | 0.2 | 0.2 | 0.4 | 0.4 | 0.4 | 0.5 | 0.6 | 0.6 | 0.4 | 0.4 | 0.4 |
| pH of solution (C) | 3.2 | 3.2 | 2.8 | 3.2 | 3.0 | 4.5 | 3.2 | 3.2 | 3.2 | 5.0 | 2.0 | 3.2 | 3.1 |
| Layered clay compound (parts by weight) | — | — | — | — | — | — | — | — | — | — | — | — | — |
| Crosslinking agent (parts by weight) | — | — | — | — | — | — | — | — | — | — | — | — | — |
| Total metal alkoxide component ($*10^{-2}$ mole) | 85 | 87 | 64 | 86 | 83 | 29 | 83 | 105 | 73 | 28 | 87 | 87 | 87 |
| Metal alkoxide (II)/(I) (molar ratio) | 28 | 30 | 12 | 150 | 3.9 | 9.3 | 89 | 36 | 28 | 21 | 30 | 30 | 30 |
| Weight after removal of organic components (% by weight) | 50 | 50 | 40 | 50 | 50 | 25 | 45 | 55 | 50 | 31 | 50 | 50 | 50 |

TABLE 2

| Example | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 10 |
|---|---|---|---|---|---|---|---|---|---|---|---|---|---|
| Storage stability | | | | | | | | | | | | | |
| 25° C.*1 day | ◎ | ◎ | ◎ | ◎ | ◎ | ◎ | ◎ | ◎ | ◎ | ◎ | ◎ | ◎ | ◎ |
| 25° C.*10 days | ◎ | ◎ | ◎ | ◎ | ◎ | ◎ | ◎ | ◎ | ◎ | ◎ | ◎ | ◎ | ◎ |
| 50° C.*10 days | ○ | ◎ | ◎ | ◎ | ○ | ◎ | ○ | ○ | ○ | ○ | ◎ | ◎ | ○ |
| 50° C.*30 days | ○ | ◎ | ◎ | ◎ | ○ | ◎ | ○ | ○ | ○ | ○ | ◎ | ◎ | ○ |
| Appearance | ○ | ○ | ○ | ○ | ○ | ○ | ○ | ○ | ○ | ○ | ○ | ○ | ○ |

TABLE 2-continued

| Example | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 10 |
|---|---|---|---|---|---|---|---|---|---|---|---|---|---|
| Coated base film | OPET | OPET | OPET | OPET | OPET | OPET | OPET | OPET | OPET | OPET | OPET | — | OPET |
| Barrier properties | | | | | | | | | | | | | |
| 20° C.*95% RH | 0.05 | 0.08 | 0.09 | 0.07 | 0.01 | 0.20 | 0.10 | 0.01 | 0.09 | 0.14 | 0.04 | 0.09 | 0.08 |
| Property unevenness | 0/10 | 0/10 | 0/10 | 0/10 | 0/10 | 0/10 | 0/10 | 1/10 | 0/10 | 0/10 | 0/10 | 0/10 | 0/10 |
| Bending resistance | 3/100 | 7/100 | 7/100 | 6/100 | 3/100 | 3/100 | 6/100 | 7/100 | 7/100 | 7/100 | 7/100 | 7/100 | 7/100 |

Example 14

There was dissolved 100 parts by weight of an ethylenevinyl acetate copolymer (ratio of ethylene modification: 8 mole %) having a degree of polymerization of 300 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.5 mole %, an amount of remaining sodium acetate of 0.5% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160 for 5 minutes, to give vinyl alcohol polymer composition (II)/OPET (2 μm/12 μm) laminates with a colorless, transparent coating film having a good appearance. The results of evaluation on the gas-barrier properties of the obtained laminates are shown in Table 4.

Example 15

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 1.0% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.8 mole %, an amount of remaining sodium acetate of 0.2% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition (II)/OPET (2 μm/12 μm) laminates with a colorless, transparent coating film having a good appearance. The results of evaluation on the gas-barrier properties of the obtained laminates are shown in Table 4.

Example 16

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 2.0% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 1.3 mole %, an amount of remaining sodium acetate of 0.2% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 84.5 parts by weight of tetramethoxysilane was dissolved in 84.5 parts by weight of methanol. To the solution, 19.9 parts by weight of distilled water and 2.8 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition (II)/OPET (2 μm/12 μm) laminates with a colorless, transparent coating film having a good appearance. The results of evaluation on the gas-barrier properties of the obtained laminates are shown in Table 4.

Example 17

There was dissolved 100 parts by weight of an ethylene-vinyl acetate copolymer (ratio of ethylene modification: 8 mole % having a degree of polymerization of 500 in 120 parts by weight of methanol. To the solution 8.6 parts by weight of tetramethoxysilane and a small amount of distilled water were added, and 67 parts by weight of a 4% sodium hydroxide/methanol solution was added to the mixture with stirring, to prepare a reaction liquid having a water content of 4.0% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 1.9 mole %, an amount of remaining sodium acetate of 0.2% by weight and an amount of Si atom of 5.0 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 80.3 parts by weight of tetramethoxysilane was dissolved in 80.3 parts by weight of methanol. To the solution, 19.0 parts by weight of distilled water and 2.6 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition (II)/OPET (2 μm/12 μm) laminates with a colorless, transparent coating film having a good appearance. The results of evaluation on the gas-barrier properties of the obtained laminates are shown in Table 4.

Example 18

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.4% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. Immediately after the addition, 200 parts by weight of a 10% by weight aqueous solution of a polyacrylic acid (made by Wako Pure Chemical Industries, Ltd.; average molecular weight: 25,000) was added with stirring. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 µm with a bar coater to a thickness after drying of 2 µm. The films were dried at 80° C. for 5 minutes and then heat treated at 160° C. for 5 minutes, to give vinyl alcohol polymer composition (II)/OPET (2 µm/12 µm) laminates with a colorless, transparent coating film having a good appearance. The results of evaluation on the gas-barrier properties of the obtained laminates are shown in Table 4.

Example 19

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.4% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. Immediately after the addition, 200 parts by weight of a 10% aqueous solution of a maleic anhydride-methyl vinyl ether alternate copolymer (GANTREZ AN 119; made by ISP Co.) was added with stirring. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 µm with a bar coater to a thickness after drying of 2 µm. The films were dried at 80° C. for 5 minutes and then heat treated at 160° C. for 5 minutes, to give vinyl alcohol polymer composition (II)/OPET (2 µm/12 µm) laminates with a colorless, transparent coating film having a good appearance. The results of evaluation on the gas-barrier properties of the obtained laminates are shown in Table 4.

Example 20

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.5% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. Immediately after the addition, 20 parts by weight of a 10% aqueous solution of a synthetic mica (SOMASIF ME-100; made by CO-OP Chemical Co., Ltd.) was added with stirring. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 µm with a bar coater to a thickness after drying of 2 µm. The films were dried at 80° C. for 5 minutes and then heat treated at 160° C. for 5 minutes, to give vinyl alcohol polymer composition (II)/OPET (2 µm/12 µm) laminates with a colorless, transparent coating film having a good appearance. The results of evaluation on the gas-barrier properties of the obtained laminates are shown in Table 4.

Example 21

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.4% by weight and an amount of Si 98 atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. Immediately after the addition, 100 parts by weight of a 10% aqueous solution of a synthetic mica (SOMASIF ME-100) was added with stirring. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 4.

Example 22

There was dissolved 100 parts by weight of, an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.4% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 10.5 parts by weight of tetramethoxysilane was dissolved in 10.5 parts by weight of methanol. To the solution, 2.5 parts by weight of distilled water and 0.07 part by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 4.

Example 23

There was dissolved 100 parts by weight of an ethylene-vinyl acetate copolymer (ratio of ethylene modification: 8 mole %) having a degree of polymerization of 500 in 120 parts by weight of methanol. To the solution 4.3 parts by weight of tetramethoxysilane and a small amount of distilled water were added, and 67 parts by weight of a 4% sodium hydroxide/methanol solution was added to the mixture with stirring, to prepare a reaction liquid having a water content of 0.5% by weight. The liquid was subjected to reaction at 40° C. for 10 minutes to yield a gel. The gel was pulverized and, in 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition (I) having a ratio of remaining acyl group originating from the vinyl carboxylate unit contained in the ethylene-vinyl acetate copolymer of 0.6 mole %, an amount of remaining sodium acetate of 0.5% by weight and an amount of Si atom of 2.5 moles based on 100 moles of the acyl group originating from the vinyl carboxylate unit. The vinyl alcohol polymer composition (I) was dissolved in distilled water to give an aqueous solution having a solid matter concentration of 10% by weight.

Next, 129 parts by weight of tetramethoxysilane was dissolved in 90 parts by weight of methanol. Quickly thereafter, the obtained solution was added, with stirring, to the above 10% aqueous vinyl alcohol polymer composition (I) solution. After the addition, 1N-hydrochloric acid was used to adjust the pH at about 3. The resulting mixed solution showed a storage stability as shown in Table 4.

The mixed solution was allowed to stand at 25° C. for 1 day or at 40° C. for 10 days. The two solutions were each applied onto an OPET having a thickness of 12 $\mu$m with a bar coater to a thickness after drying of 2 $\mu$m. The films were dried at 80° C. for 5 minutes and then heat treated at 160° C. for 5 minutes, to give vinyl alcohol polymer composition (II)/OPET (2 $\mu$m/12 $\mu$m) laminates with a colorless, transparent coating film having a good appearance. The results of evaluation on the gas-barrier properties of the obtained laminates are shown in Table 4.

The compositions and conditions employed in Examples 14 through 23 are summarized in Table 3.

TABLE 3

| Example | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|
| The 1st step | | | | | | | | | | |
| Metal alkoxide (I) | TMOS | TMOS | TMOS | TMOS | TMOS | TMOS | TMOS | TMOS | TMOS | TMOS |
| (*$10^{-2}$ mole) | 2.5 | 2.5 | 2.5 | 5.0 | 2.5 | 2.5 | 2.5 | 2.5 | 2.5 | 2.5 |
| Degree of polymerization | 300 | 500 | 500 | 500 | 500 | 500 | 500 | 500 | 500 | 500 |
| Ratio of ethylene Modification (mole %) | 8 | 8 | 8 | 8 | 8 | 8 | 8 | 8 | 8 | 8 |
| Water content (% by weight) | 0.5 | 1 | 2 | 4 | 0.5 | 0.5 | 0.5 | 0.5 | 0.5 | 0.5 |
| Ratio of remaining acyl group (mole %) | 0.5 | 0.8 | 1.3 | 1.9 | 0.6 | 0.6 | 0.6 | 0.6 | 0.6 | 0.6 |
| Content of carboxylic acid salt (% by weight) | 0.5 | 0.2 | 0.2 | 0.2 | 0.4 | 0.4 | 0.5 | 0.4 | 0.4 | 0.5 |
| pH of solution (C) | 3.1 | 3.0 | 3.0 | 3.2 | 2.8 | 3.0 | 3.0 | 3.2 | 3.1 | 3.1 |
| Layered clay compound (parts by weight) | — | — | — | — | — | — | — | — | — | — |
| Crosslinking agent (parts by weight) | — | — | — | — | 20 | 20 | — | — | — | — |
| Total metal alkoxide component (*$10^{-2}$ mole) | 88 | 88 | 58 | 58 | 88 | 88 | 88 | 88 | 9.7 | 88 |
| Metal alkoxide (II)/(I) (molar ratio) | 30 | 30 | 20 | 9.3 | 30 | 30 | 30 | 30 | 2.4 | 30 |
| Weight after removal of organic components (% by weight) | 50 | 50 | 40 | 40 | 42 | 42 | 51 | 55 | 10 | 50 |

TABLE 4

| Example | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|
| Storage stability | | | | | | | | | | |
| 25° C.* 1 day | ⊚ | ⊚ | ⊚ | ⊚ | ⊚ | ⊚ | ⊚ | ⊚ | ⊚ | ⊚ |
| 25° C.* 10 days | ⊚ | ⊚ | ⊚ | ⊚ | ⊚ | ⊚ | ⊚ | ⊚ | ⊚ | ⊚ |
| 50° C.* 10 days | ⊚ | ⊚ | ⊚ | ⊚ | ○ | ○ | ○ | ○ | ⊚ | ⊚ |
| 50° C.* 30 days | ⊚ | ⊚ | ⊚ | ⊚ | ○ | ○ | ○ | ○ | ⊚ | ⊚ |
| Appearance | ○ | ○ | ○ | ○ | ○ | ○ | ○ | ○ | ○ | ○ |
| Coated base film | OPET | OPET | OPET | OPET | OPET | OPET | OPET | OPET | OPET | OPET |
| Barrier properties | | | | | | | | | | |
| 20° C.* 95% RH | 0.12 | 0.01 | 0.01 | <0.01 | 0.01 | 0.01 | 0.01 | 0.01 | 0.32 | 0.05 |
| Property unevenness | 0/10 | 0/10 | 0/10 | 0/10 | 0/10 | 0/10 | 0/10 | 0/10 | 0/10 | 0/10 |
| Bending resistance | 14/100 | 7/100 | 5/100 | 5/100 | 0/100 | 0/100 | 0/100 | 0/100 | 0/100 | 7/100 |

With the items contained in "The 1st step" in Tables 1 and 3, "Metal alkoxide component (I)" means the amount of the metal alkoxide component (I) used on saponification of the vinyl carboxylate polymer used in the first step, in terms of the moles of metal atom contained in the metal alkoxide component (I) based on 100 moles of the acryl group originating from the vinyl carboxylate unit present in the vinyl carboxylate polymer; "Water content" means the water content in the reaction mixture in % by weight; "Ratio of remaining acyl group" means the molar fraction (mole %) of the aryl group remaining in the vinyl alcohol polymer contained in the vinyl alcohol polymer composition (I) obtained by the saponification, based on the moles of the acyl group originally present in the vinyl carboxylate polymer used; and "Content of carboxylic acid salt" means the amount of the carboxylic acid salt in the carboxylic acid-based compounds byproduced by the saponification, in terms of the weight ratio (% by weight) in the vinyl alcohol polymer composition (I) obtained by removal of the solvent after the saponification.

Further in Tables 1 and 3, "Total metal alkoxide component" means the total amount in moles of the metal alkoxide components used; "Metal alkoxide (II)/(I)" means the ratio between the moles of the metal atom present in the metal alkoxide component (II) and the moles of the metal atom present in the metal alkoxide component (I); and "Weight after removal of organic components" means the weight of the vinyl alcohol polymer composition (II) after removal by thermal decomposition of organic components, in terms of ratio by weight (% by weight) based on the weight after vacuum drying and before the thermal decomposition.

In the items for "Storage stability" of Tables 2 and 4, the column "25° C. *1 day" shows the evaluation of the solution viscosity after the solution has been allowed to stand at 25° C. for 1 day; the column "25° C.*10 days" shows the evaluation of the solution viscosity after the solution has been allowed to stand at 25° C. for 10 days; the column "50° C.*10 days" shows the evaluation of the solution viscosity after the solution has been allowed to stand at 50° C. for 10 days; and the column "50° C. * 30 days" shows the evaluation of the solution viscosity after the solution has been allowed to stand at 50° C. for 30 days. "Coated base film" means the material of the base film used on production of the laminate. In the item "Barrier properties", the column "20° C. *95% RH" shows the oxygen transmission rate determined at 20° C. and 95% RH in the unit "cc·20 $\mu$m/m$^2$·24 hr·atm".

Comparative Example 1

An ethylene-vinyl alcohol copolymer (ethylene modification ratio: 32 mole %, degree of saponification: 99.8 mole %, sodium acetate content: 0.2% by weight) was dissolved in a mixed distilled water/isopropanol solution (ratio by weight: 50/50) to a solid matter concentration of 10% by weight. The solution was evaluated for storage stability. The results are shown in Table 6. The solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give ethylene-vinyl alcohol copolymer composition/OPET (2 μm/12 μm) laminates with a colorless, transparent coating film having a good appearance. The results of evaluation on the gas-barrier properties of the obtained laminates are shown in Table 6.

Comparative Example 2

There was dissolved 18.5 parts by weight of a polyvinyl acetate having a degree of polymerization of 1,700 in 200 parts by weight of methanol. To the solution 1.26 parts by weight of tetramethoxysilane, a small amount of distilled water and 1.0 part by weight of 1N-hydrochloric acid were added, to prepare a reaction liquid, a sol, having a water content of 0.7% by weight. Part of the sol was taken out and evaluated for storage stability. The results are shown in Table 6.

The sol was allowed to stand at 25° C. for 1 day or at 40° C. for 10 days. The two sols were each flown into a flat-bottomed polytetrafluoroethylene (TEFLON, made by du Pont Co.) container to a thickness after drying of 2 μm. The top open part of the container was covered with a polyvinylidene chloride film (SARAN WRAP, made by Asahi Kasei Co., Ltd.) and the contents were permitted to continue reaction at 60° C. for 4 hours. Thereafter the covering film was perforated with a needle to a perforation ratio by area of 1%, and the reaction was further continued at 60° C. for 8 hours, to obtain single-layer films having aggregates near the surface, the films being colorless, transparent though. The vinyl alcohol polymer composition showed a ratio of remaining acyl group originating from the vinyl carboxylate unit contained in the polyvinyl acetate of 5 mole % and an amount of remaining carboxylic acid salt of 0%. The results of evaluation on the obtained single-layer films are shown in Table 6.

Comparative Example 3

There was dissolved 100 parts by weight of a modified polyvinyl alcohol copolymerized with 0.5 mole % of vinyl trimethoxysilane and having a degree of polymerization of 550, a degree of saponification of 99.0 mole % and an amount of remaining carboxylic acid salt of 0% in distilled water to a solid matter concentration of 10% by weight.

Next, 232 parts by weight of tetraethoxysilane was dissolved in 300 parts by weight of ethanol. To the solution, 28 parts by weight of distilled water and 11.1 parts by weight of 1N-hydrochloric acid were added, to prepare a sol. The sol was subjected to reaction with stirring at 40° C. for 1 hour. The sol thus obtained was added with stirring to the above 10% aqueous vinyl alcohol polymer composition solution. The resulting mixed solution showed a storage stability as shown in Table 6. The mixed solution was allowed to stand at 25 ° C. for 1 day or at 40° C. for 10 days.

The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition/OPET (2 μm/12 μm) laminates with a colorless, transparent coating film having a good appearance.

The results of evaluation on the gas-barrier properties of the obtained laminates are shown in Table 6.

Comparative Example 4

There was dissolved 100 parts by weight of a polyvinyl alcohol having a degree of polymerization of 550, a degree of saponification of 99.0 mole % and an amount of remaining sodium acetate of 0.5% by weight in 900 parts by weight of dimethylacetamide. the solution 3.3 parts by weight of triethoxychlorosilane and 0.5 part by weight of pyridine were added, and the mixture was reacted with stirring at room temperature for 3 hours. The resulting mixture was reprecipitated from acetone, to yield a polyvinyl alcohol modified with 1 mole % of silyl group. The modified polyvinyl alcohol polymer thus obtained was dissolved in a mixed distilled water/methanol solution (ratio by weight: 50/50) to give a solution.

Next, 232 parts by weight of tetraethoxysilane was dissolved in 300 parts by weight of ethanol. To the solution, 28 parts by weight of distilled water and 11.1 parts by weight of 1N-hydrochloric acid were added, to prepare a sol. The sol was subjected to reaction with stirring at 40° C. for 1 hour. The sol thus obtained was added with stirring to the above 10% aqueous vinyl alcohol polymer composition solution. The resulting mixed solution showed a storage stability as shown in Table 6.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160° C. for 5 minutes, to give vinyl alcohol polymer composition/OPET (2 μm/12 μm) laminates with a colorless, transparent coating film having a good appearance.

The results of evaluation on the gas-barrier properties of the obtained laminates are shown in Table 6.

Comparative Example 5

There was dissolved 100 parts by weight of an ethylenevinyl acetate copolymer (ratio of ethylene modification: 8 mole %) having a degree of polymerization of 500 in 120 parts by weight of methanol. To the solution a small amount of distilled water was added, and 67 parts by weight of a 4% sodium hydroxide /methanol solution was added to the mixture with stirring, to prepare a reaction liquid having a water content of 0.09% by weight. The liquid was subjected to reaction at 40° C. for 10 minutes to yield a gel. The gel was pulverized and, 1,500 parts by weight of methanol, further permitted to continue reaction at 60° C. for 4 hours. Thereafter, the reaction mixture was neutralized by adding 6.0 parts by weight of methyl acetate and washing 3 times with 1,000 parts by weight of methanol, and vacuum dried at 65° C. for 24 hours to remove the solvent, to yield a vinyl alcohol polymer composition having a ratio of remaining acyl group originating from the vinyl carboxylate unit contained in the ethylene-vinyl acetate copolymer of 1 mole % and an amount of remaining sodium acetate of 0.5% by weight. The vinyl alcohol polymer composition was dissolved in distilled water to give an aqueous solution having a solid matter concentration of 10% by weight.

Next, 129 parts by weight of tetramethoxysilane was dissolved in 90 parts by weight of methanol. To the solution, 21 parts by weight of distilled water and 8.5 parts by weight of 1N-hydrochloric acid were added, to prepare a sol. The sol was subjected to reaction with stirring at 40° C. for 1 hour. The sol thus obtained was diluted with 200 parts by weight of distilled water and, quickly thereafter, the obtained mixture was added, with stirring, to the above 10% aqueous vinyl alcohol polymer composition solution. After the addition, 1N-hydrochloric acid was used to adjust the pH at about 3. The resulting mixed solution showed a storage stability as shown in Table 6.

The mixed solution was allowed to stand at 25° C. for 1 day or at 40° C. for 10 days. The two solutions were each applied onto an OPET having a thickness of 12 μm with a bar coater to a thickness after drying of 2 μm. The films were dried at 80° C. for 5 minutes and then heat treated at 160 for 5 minutes, to give vinyl alcohol polymer composition/OPET (2 μm/12 μm) laminates with a colorless, transparent coating film having a good appearance. The results of evaluation on the gas-barrier properties of the obtained laminates are shown in Table 6.

The compositions and conditions employed in Comparative Examples 1 through 5 are summarized in Table 5.

TABLE 5

| Example | Comp. Ex. 1 | Comp. Ex. 2 | Comp. Ex. 3 | Comp. Ex. 4 | Comp. Ex. 5 |
|---|---|---|---|---|---|
| The 1st step | | | | | |
| Metal alkoxide component (I) | — | TMOS | — | — | — |
| (*$10^{-2}$ mole) | — | 3.9 | — | — | — |
| Degree of polymerization | — | 1700 | — | — | 500 |
| Ratio of ethylene modification (mole %) | — | 0 | — | — | 8 |
| Water content (% by weight) | — | 0.7 | — | — | 0.09 |
| Ratio of remaining acyl group (mole %) | — | — | — | — | 1 |
| Content of carboxylic acid salt (% by weight) | — | 0 | — | — | 0.5 |
| pH of solution (C) | — | — | — | — | — |
| Layered clay compound (parts by weight) | — | — | — | — | — |
| Crosslinking agent (parts by weight) | — | — | — | — | — |
| Total metal alkoxide component (*$10^{-2}$ mole) | — | 3.9 | 50 | 50 | 85.4 |
| Weight after removal of organic components (% by weight) | 0 | 5 | 40 | 41 | 50 |

TABLE 6

| Example | Comp. Ex. 1 | Comp. Ex. 2 | Comp. Ex. 3 | Comp. Ex. 4 | Comp. Ex. 5 |
|---|---|---|---|---|---|
| Storage stability | | | | | |
| 25° C.*1 day | ⊚ | ◯ | ◯ | ◯ | ⊚ |
| 25° C.*10 days | ⊚ | X | X | X | ⊚ |
| 50° C.*10 days | ⊚ | X | X | X | ◯ |
| 50° C.*30 days | ⊚ | X | X | X | ◯ |
| Appearance | ◯ | X | ◯ | ◯ | X |
| Coated base film | OPET | — | OPET | OPET | OPET |

TABLE 6-continued

| Example | Comp. Ex. 1 | Comp. Ex. 2 | Comp. Ex. 3 | Comp. Ex. 4 | Comp. Ex. 5 |
|---|---|---|---|---|---|
| Barrier properties | | | | | |
| 20° C.*95% RH | 10 | 1.2 | 2.2 | 2.8 | 1.5 |
| Property unevenness | 0/10 | 10/10 | 10/10 | 10/10 | 10/10 |
| Bending resistance | 0/100 | 0/100 | 1/100 | 13/100 | 93/100 |

In Tables 5 and 6, "Metal alkoxide component (I)", "Water content", "Ratio of remaining acyl group", "Content of carboxylic acid salt", "Total metal alkoxide component", "25° C.*1 day", "25° C.*10 days", "50° C.*10 days", "50° C.*30 days", "Coated base film" and "20° C.*95% RH" mean the same as described for Tables 1 through 4. "Weight after removal of organic components" means, for the vinyl alcohol polymer composition to be used for producing single-layer films or laminates, the weight of the vinyl alcohol polymer composition after removal by thermal decomposition of organic components, in terms of ratio by weight (% by weight) based on the weight after vacuum drying and before the thermal decomposition.

Example 24

Example 1 was repeated except that the mixed solution was, after standing at 25° C. for 1 day or at 40° C. for 10 days, applied onto, instead of the OPET, an oriented Ny6 film (hereinafter sometimes referred to as "ONy6", to obtain vinyl alcohol polymer composition (II)/ONy6 (2 μm /12 μm) laminates with a colorless, transparent coating film having a good appearance. The results of evaluation on the gas-barrier properties of the obtained laminates are shown in Table 7.

Example 25

Example 2 was repeated except that the mixed solution was, after standing at 25° C. for 1 day or at 40° C. for 10 days, applied onto, instead of the OPET, an unoriented PP film (hereinafter sometimes referred to as "CPP") and that thereafter the coated object was subjected to, after drying at 80° C. for 5 minutes, instead of heat treatment at 160° C. for 5 minutes, heat treatment at 80° C. for 5 minutes under UV irradiation with a low-pressure mercury lamp, to obtain vinyl alcohol polymer composition (II)/CPP (2 μm/60 μm) laminates with a colorless, transparent coating film having a good appearance. The results of evaluation on the gas-barrier properties of the obtained laminates are shown in Table 7.

Example 26

A CPP was dry laminated onto each of the vinyl alcohol polymer composition (II)/OPET (2 μm/12 μm) laminates obtained in Example 2, to obtain CPP/vinyl alcohol polymer composition (II)/OPET (60 μm/2 μm/12 μm) laminates. The results of evaluation on the gas-barrier properties of the obtained laminates are shown in Table 7.

Example 27

A PE film and paper (kraft paper, 200 g/m$^2$) were dry laminated onto each of the laminates comprising the vinyl alcohol polymer composition (II)/OPET (2 μm/12 μm) and obtained in Example 2, to obtain laminates comprising PE/paper/vinyl alcohol polymer composition (II)/OPET/PE (20 μm/100 μm/2 μm/12 μm/20 μm). The results of evaluation on the gas-barrier properties of the obtained laminates are shown in Table 7.

Example 28

A CPP was dry laminated onto each of the single-layer films comprising the vinyl alcohol polymer composition (II) and obtained in Example 12, to obtain laminates comprising CPP/vinyl alcohol polymer composition (II)/CPP (60 μm/100 μm/60 μm). The results of evaluation on the gas-barrier properties of the obtained laminates are shown in Table 7.

Example 29

An ONy6 and a CPP were dry laminated onto each of the laminates comprising the vinyl alcohol polymer composition (II)/OPET (2 μm/12 μm) and obtained in Example 2, to obtain laminates comprising OPET/vinyl alcohol polymer composition (II)/ONy6/CPP (12 μm/2 μm/20 μm/60 μm). The results of evaluation on the gas-barrier properties of the obtained laminates are shown in Table 7.

Example 30

A CPP was dry laminated onto each of the laminates comprising the vinyl alcohol polymer composition (II)/ONy6 (2 μm/12 μm) and obtained in Example 24, to obtain laminates comprising ONy6/vinyl alcohol polymer composition (II)/CPP (20 μm/2 μm/60 μm). The results of evaluation on the gas-barrier properties of the obtained laminates are shown in Table 7.

Example 31

An ONy6 and a CPP were dry laminated onto each of the laminates comprising the vinyl alcohol polymer composition (II)/OPET (2 μm/12 μm) and obtained in Example 2, to obtain laminates comprising ONy6/vinyl alcohol polymer composition (II)/OPET/CPP (20 μm/2 μm/12 μm/60 μm). The results of evaluation on the gas-barrier properties of the obtained laminates are shown in Table 7.

tuting the laminate, and "Thickness construction" the thicknesses of the materials.

It is understood from the results shown in Tables 1 through 7, that the reaction solutions comprising the vinyl alcohol polymer compositions and obtained in Examples 1 through 23 according to the present invention not only have good storage stability but provide, when applied on bases, coating films having good appearance. It is also understood that the obtained coating films have excellent gas-barrier properties, in particular excellent gas-barrier properties under high-humidity conditions, while suffering from little unevenness which may occur after long storage of the solutions, and show little decrease in the gas-barrier properties even after exposure to repeated bending. It is further understood that the laminates obtained in Examples 24 through 31 according to the present invention not only have excellent gas-barrier properties, but also show little property unevenness which may occur after long storage, as well as little decrease in the gas-barrier properties even after exposure to repeated bending.

On the other hand, it is also understood that Comparative Examples all failed to achieve good storage stability and good gas-barrier properties at the same time, these Comparative Examples deviating from the present invention in the following points. That is, Comparative Example 1 used no metal alkoxide component and Comparative Example 2 used one only in the first step, whereas the present invention comprises addition of a metal alkoxide component both in the step of saponification of a vinyl carboxylate polymer and to the reaction mixture. Comparative Example 3 comprised, instead of adding a metal alkoxide in the first step, using a silyl-modified polyvinyl alcohol. Comparative Example 4 comprised, instead of adding a metal alkoxide in the first step, modifying a polyvinyl alcohol with a chlorosilane compound. Comparative Example 5 comprised adding a metal alkoxide component only in the second step.

The vinyl alcohol polymer compositions obtained by the present invention are improved not only in the gas-barrier properties under high-humidity conditions that have been insufficient with conventional vinyl alcohol polymers but also in the property unevenness, bending resistance and storage stability in the form of solutions that have been

TABLE 7

| Example | Ex. 24 | Ex. 25 | Ex. 26 | Ex. 27 | Ex. 28 | Ex. 29 | Ex. 30 | Ex. 31 |
| --- | --- | --- | --- | --- | --- | --- | --- | --- |
| Vinyl alcohol polymer composition (II) | Example 1 | Example 2 | Example 2 | Example 2 | Example 12 | Example 2 | Example 24 | Example 2 |
| Layer construction (Thickness construction: μm) | PVA*/ONy6 (2/20) | PVA*/CPP (2/60) | CPP/PVA*/OPET (60/2/12) (20/100/2/12/20) | PE/Paper/PVA*/OPET/PE | CPP/cast PVA*/CPP (60/100/60) | OPET/PVA*/ONy6/CPP (12/2/20/60) | ONy6/PVA*/CPP (20/2/60) | ONy6/PVA*/OPET/CPP (20/2/12/60) |
| Barrier properties | | | | | | | | |
| 20° C.*95% RH | 0.06 | 0.06 | <0.01 | <0.01 | <0.01 | <0.01 | <0.01 | <0.01 |
| Property unevenness | 0/10 | 0/10 | 0/10 | 0/10 | 0/10 | 0/10 | 0/10 | 0/10 |
| Bending resistance | 0/100 | 0/100 | 0/100 | 0/100 | 0/100 | 0/100 | 0/100 | 0/100 |

In the above Table 7, "20° C.*95% RH" means the same as explained for Table 2. "Vinyl alcohol polymer composition (II)" means the Example in which the vinyl alcohol polymer composition (II) constituting the laminate has been prepared. "Layer construction" means the materials constiinsufficient with conventional vinyl alcohol polymer compositions. The vinyl alcohol polymer compositions of the present invention can therefore be effectively used as packaging materials for foods, medicines, medical appliances, machine parts, clothing and the like, in particular for packaging foods, which use requires good gas-barrier properties under high-humidity conditions.

The priority document of the present application, Japanese Patent Application 229459/2000, filed Jul. 28, 2000, is hereby incorporated by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A process for producing a vinyl alcohol polymer composition, comprising:

providing a reaction liquid comprising a solution containing a vinyl carboxylate polymer and, a first metal alkoxide (I) having at least one functional group and/or an oligomer (I) having at least one functional group obtained from said metal alkoxide (I);

a step of simultaneously effecting (a) saponification of said vinyl carboxylate polymer and (b) reaction in which at least part of the functional groups of said metal alkoxide (I) and/or said oligomer (I) participates, thereby obtaining a vinyl alcohol polymer composition (I); and a step of preparing a solution (A) containing said vinyl alcohol polymer composition (I), followed by adding to the solution (A) a second metal alkoxide (II) and/or an oligomer (II) obtained from the metal alkoxide (II) or another solution (B) containing the metal alkoxide (II) and/or the oligomer (II) derived from the metal alkoxide (II), to prepare an intermediate product solution (C), and then removing the solvent from said solution (C), to produce a vinyl alcohol polymer composition (II).

2. The process according to claim 1, wherein water is present in said reaction liquid an amount of 300 to 200,000 ppm during said simultaneous saponification (a) and reaction (b).

3. The process according to claim 1, wherein a pH of the solution (C) is adjusted to 1.0 to 8.0.

4. The process according to claim 1, wherein the oligomer (II) is obtained from a reaction mixture comprising the metal alkoxide (II), an acid catalyst and water.

5. The process according to claim 1, wherein the amount of the metal atom contained in the metal alkoxide (I) and/or oligomer (I) is 0.01 to 75 moles based on 100 moles of the vinyl carboxylate unit constituting the vinyl carboxylate polymer.

6. The process according to claim 1, wherein the weight of the vinyl alcohol polymer composition (II) after removal of organic components by thermal decomposition is 10 to 70% by weight based on the weight of the vinyl alcohol polymer composition (II) before the removal.

7. The process according to claim 1, wherein a molar ratio between the metal atom (I) contained in the metal alkoxide (I) and/or oligomer (I) and the metal atom (II) contained in the metal alkoxide (II) and/or oligomer (II) is 0.01 to 18,000.

8. The process according to claim 1, wherein the vinyl carboxylate polymer is an ethylene-vinyl carboxylate copolymer having an ethylene unit content of 0.5 to 80 mole % based on all constituting monomer units.

9. The process according to claim 1, wherein the vinyl carboxylate polymer has a degree of polymerization of 500 to 10,000.

10. The process according to claim 1, wherein said saponification (a) and said reaction (b) are simultaneously effected in the presence of an alkali metal hydroxide and/or an alkali earth metal hydroxide; and wherein an amount of the carboxylic acid salt contained in the vinyl alcohol polymer composition (I) is not more than 5% by weight based on the dry weight of the vinyl alcohol polymer composition (I).

11. The process according to claim 1, further comprising: adding a layered clay compound to the solution (C).

12. The process according to claim 1, further comprising: adding a crosslinking agent to the solution (C).

13. A coating agent, comprising:

an intermediate product solution (C) prepared by a process, comprising:

providing a reaction liquid comprising a solution containing a vinyl carboxylate polymer and, a first metal alkoxide (I) having at least one functional group and/or an oligomer (I) having at least one functional group obtained from said metal alkoxide (I);

a step of simultaneously effecting (a) saponification of said vinyl carboxylate polymer and (b) reaction in which at least part of the functional groups of said metal alkoxide (I) and/or said oligomer (I) participates, thereby obtaining a vinyl alcohol polymer composition (I); and a step of preparing a solution (A) containing said vinyl alcohol polymer composition (I), followed by adding to the solution (A) a second metal alkoxide (II) and/or an oligomer (II) obtained from the metal alkoxide (II) or another solution (B) containing the metal alkoxide (II) and/or the oligomer (II) derived from the metal alkoxide (II), to prepare an intermediate product solution (C).

14. A laminate, comprising:

a layer comprising the vinyl alcohol polymer composition (II) obtained by the process of claim 1.

15. A gas-barrier material, comprising:

the vinyl alcohol polymer composition (II) obtained by the process of claim 1.

16. The laminate according to claim 14, having a layer of a polyester/vinyl alcohol polymer composition (II), a layer of a polyamide/vinyl alcohol polymer composition (II) or a layer of a polyolefin/vinyl alcohol polymer composition (II).

17. A process for producing a vinyl alcohol polymer composition, comprising:

providing a reaction liquid comprising a solution containing a vinyl carboxylate polymer and, a first metal alkoxide (I) having at least one functional group and/or an oligomer (I) having at least one functional group obtained from said metal alkoxide (I);

simultaneously effecting (a) saponification of said vinyl carboxylate polymer and (b) reaction in which at least part of the functional groups of said metal alkoxide (I) and/or said oligomer (I) participates, thereby obtaining a vinyl alcohol polymer composition (I); and preparing a solution (A) containing said vinyl alcohol polymer composition (I), followed by adding to the solution (A) a second metal alkoxide (II) and/or an oligomer (II) obtained from the metal alkoxide (II) or another solution (B) containing the metal alkoxide (II) and/or the oligomer (II) derived from the metal alkoxide (II), to prepare an intermediate product solution (C), and then removing the solvent from said solution (C), to produce a vinyl alcohol polymer composition (II).

* * * * *